(12) United States Patent
Kashito et al.

(10) Patent No.: US 8,031,171 B2
(45) Date of Patent: Oct. 4, 2011

(54) IMAGE DISPLAY DEVICE, IMAGE DATA TRANSMITTING DEVICE, IMAGE DISPLAY SYSTEM, IMAGE DISPLAY METHOD, STORAGE MEDIUM STORING AN IMAGE DISPLAY PROGRAM IMAGE DATA TRANSMISSION PROGRAM, AND STORAGE MEDIUM STORING AN IMAGE DATA TRANSMISSION PROGRAM

(75) Inventors: Kiyotaka Kashito, Kobe (JP); Azusa Umemoto, Kizugawa (JP); Soichi Nitta, Narashino (JP); Masafumi Hirata, Tokyo (JP); Aya Enatsu, Chiba (JP); Tatsuo Sudo, Chiba (JP); Takuya Kinoshita, Chiba (JP); Masafumi Takahashi, Sakura (JP)

(73) Assignee: Sharp Kabushiki Kaisha, Osaka (JP)

( * ) Notice: Subject to any disclaimer, the term of this patent is extended or adjusted under 35 U.S.C. 154(b) by 842 days.

(21) Appl. No.: 11/819,291

(22) Filed: Jun. 26, 2007

(65) Prior Publication Data
US 2008/0001945 A1 Jan. 3, 2008

Related U.S. Application Data

(60) Provisional application No. 60/833,257, filed on Jul. 26, 2006.

(30) Foreign Application Priority Data

Jun. 28, 2006 (JP) ................................ 2006-178523

(51) Int. Cl.
*G09G 5/00* (2006.01)
(52) U.S. Cl. ........................................ 345/156; 345/204
(58) Field of Classification Search .......... 345/156–169, 345/204; 463/37–38; 358/1.1–1.2; 348/734; 715/810
See application file for complete search history.

(56) References Cited

U.S. PATENT DOCUMENTS

| 5,543,925 A | 8/1996 | Timmermans |
| 5,757,379 A | 5/1998 | Saito |
| 5,790,084 A * | 8/1998 | Hix et al. ........................ 345/7 |

(Continued)

FOREIGN PATENT DOCUMENTS

EP 0532998 A1 3/1993

(Continued)

OTHER PUBLICATIONS

Office Action dated Dec. 10, 2010 for U.S. Appl. No. 12/874,464.

*Primary Examiner* — Ricardo L Osorio
(74) *Attorney, Agent, or Firm* — Birch, Stewart, Kolasch & Birch, LLP

(57) ABSTRACT

Upon receipt of operation entry for processing and editing a currently displayed slide, an operation information generating section generates operation information corresponding to this entry. An operation information reflecting section performs editing on the basis of the operation information and stores the operation information regarding the editing in a storage section. Upon receipt of slide data from the server device, the operation information reflecting section reads operation information of the past regarding this slide data, and generates a display screen in such a manner that editing corresponding to the read operation information is reflected in the received slide data. This makes it possible to display slide data stored in the server device on an image display device in a manner that a user wants, without increasing load on the server device.

13 Claims, 20 Drawing Sheets

U.S. PATENT DOCUMENTS

| | | |
|---|---|---|
| 6,516,154 B1 * | 2/2003 | Parulski et al. ............... 396/287 |
| 6,519,046 B1 * | 2/2003 | Kinjo ............................. 358/1.1 |
| 6,567,983 B1 * | 5/2003 | Shiimori ....................... 725/105 |
| 6,766,332 B2 * | 7/2004 | Miyazaki et al. ..................... 1/1 |
| 2002/0081092 A1 * | 6/2002 | Ozawa et al. ................... 386/46 |
| 2003/0011643 A1 * | 1/2003 | Nishihata ...................... 345/810 |
| 2003/0217118 A1 | 11/2003 | Kobayashi et al. |
| 2004/0008356 A1 | 1/2004 | Fujisawa et al. |
| 2004/0250205 A1 | 12/2004 | Conning |
| 2005/0128518 A1 | 6/2005 | Tsue et al. |
| 2006/0017994 A1 | 1/2006 | Takiyama |
| 2006/0050300 A1 | 3/2006 | Mitani et al. |
| 2006/0053468 A1 | 3/2006 | Sudoh et al. |

FOREIGN PATENT DOCUMENTS

| | | |
|---|---|---|
| EP | 1 688 848 A1 | 8/2006 |
| EP | 1 729 222 A1 | 12/2006 |
| JP | 11-088592 * | 3/1999 |
| JP | 11-88592 A | 3/1999 |
| JP | 2002-232836 A | 8/2002 |
| JP | 2002-278876 A | 9/2002 |
| JP | 2003-281523 A | 10/2003 |
| JP | 1357517 * | 10/2003 |
| JP | 2005-301493 A | 10/2005 |

* cited by examiner

FIG. 5(a)

```
<?xml version="1.0" encoding="UTF-8"?>
<mmstemplate>
  <head>
    <title>slide1</title><author>kashito</author><date>2006-04-26</date><version>1.00</version>
  </head>
  <body>
    <wizard>
      <step id="id1"
        connector="http://www.sharp.co.jp/2005/CpmConnector
        guide="get image file"
        param=" uri=@uri.txt,service=service.txt,method=method.txt,sync"
        target-name=" error1.txt error2.txt error3.txt"
        target-type="text/plain text/plain text/plain"
      />
      <step id="slide1"
        app=" svg-viewer"
        param="file=2_slide0.svg,input=repeatplay.txt,dur=time.txt,mode=mode.txt"
        target-name=" op.txt cursor.txt time.txt repeatplay.txt"
        target-type="text/plain text/plain text/plain text/plain"
      />
      <switch target-name=" op.txt">
        <nextstep xlink:href="2_title.mtd" when="1"/>
        <nextstep xlink:href="2_slide1.mtd" when="3"/>
        <nextstep xlink:href="2_thumbnail.mtd" when="4"/>
      </switch>
    </wizard>
  </body>
</mmstemplate>
```

— HEADER INFORMATION OF MTD SCRIPT

— ACQUISITION OF IMAGE FOR USE IN IMAGE DISPLAY IN SVG SCRIPT FROM SERVER

— DISPLAY OF IMAGE AND SVG SCRIPT ACQUIRED FROM SERVER

— CHANGE TO NEXT SLIDE DATA

FIG. 5(b)

```
<?xml version="1.0" encoding="UTF-8"?>
<svg width="1920" height="1080" viewBox="0 0 1920 1080"
  id=" svg" display=" inline" version="1.1" baseProfile="tiny"
  xml:space=" preserve" visibility=" visible">
  <g id=" slide01" xml:space=" preserve" visibility=" visible">
    <image x="240" y="0" width="1440" height="1080" id=" photo02" xlink:href=" slide01.jpg" />
  </g>
  <g xml:space=" preserve" visibility=" visible">
    <text x="100" y="950" id=" text02" font-size="84" fill="rgb(255, 0, 0)">いい天気でした。</text>
  </g>
</svg>
```

— DISPLAY OF IMAGE

— CHARACTER STRING OF COMMENT DISPLAYED SO AS TO BE SUPERIMPOSED ON IMAGE

FIG. 6(a)

```
<album id="1234-5678-9012-3456">
    <slide id="2_slide0">
        <rotation degree="90" />
        <zoom ratio="120%" />
        <zoom ratio="120%" />
    </slide>
    <slide id="2_slide1">
        <rotation degree="90" />
        <rotation degree="90" />
    </slide>
</album>
```

FIG. 6(b)

```
<album id="1234-5678-9012-3456">
    <slide id="slide1">
        <rotation degree="90" />
        <zoom ratio="144%" />
    </slide>
    <slide id="slide2">
        <rotation degree="180" />
    </slide>
</album>
```

FIG. 7(a)

```
<album id="1234-5678-9012-3456">
    <slide id="2_slide0">
        <rotation degree="90" />
        <zoom ratio="120%" />
        <zoom ratio="120%" />
    </slide>
</album>
```

FIG. 7(b)

```
<album id="1234-5678-9012-3456">
    <slide id="2_slide0">
        <rotation degree="90" />
    </slide>
</album>
```

IMAGE DISPLAY DEVICE, IMAGE DATA TRANSMITTING DEVICE, IMAGE DISPLAY SYSTEM, IMAGE DISPLAY METHOD, STORAGE MEDIUM STORING AN IMAGE DISPLAY PROGRAM IMAGE DATA TRANSMISSION PROGRAM, AND STORAGE MEDIUM STORING AN IMAGE DATA TRANSMISSION PROGRAM

This nonprovisional application claims priority under 35 USC Section 119(a) of Patent Application No. 178523/2006 filed in Japan on Jun. 28, 2006, and claims the benefit under 35 USC Section 119(e) of U.S. Provisional Application No. 60/833,257 filed on Jul. 26, 2006, the entire contents of all of which are hereby incorporated by reference.

FIELD OF THE INVENTION

The present invention relates to a technique of displaying an image on an image display device on the basis of data transmitted from an image data transmitting device to the image display device.

BACKGROUND OF THE INVENTION

In recent years, with the widespread use of digital cameras, photographs have been frequently dealt with in the form of image data. With this trend, it has become common to enjoy photographs in the following two ways. The first one is the conventional way that people view developed photographs. The second one is the new way that people causes an image display device to display thereon photographs stored in the form of image data. Further, a technique is known that causes a server device to store image data of photographs therein so that a plurality of users can view via a network the photographs stored in the server device.

Image data of photographs taken by a camera are stored in a server device after the image data are processed and edited by an image editing application which is provided in a personal computer or the like, as appropriate. However, image data captured by, for example, an image capturing device (e.g. camera-equipped mobile telephone) which is not provided with an image editing application are directly uploaded to and stored in a server device in the form of unedited image data.

In this case, a user who views image data stored in the server device needs to perform editing on each set of image data every time he/she views the image data. This is burdensome for the user who views the image data.

In view of this, it is considered that the server device performs editing on the image data. For example, Patent document 1 (Japanese Unexamined Patent Publication No. 278876/2002 (Tokukai 2002-278876; published on Sep. 27, 2002)) discloses the technique in which upon receipt of captured image information from the user, a server device, which is provided with an application for image data editing and in which a predetermined editing procedure is registered, automatically edits the image data.

However, the technique of Patent document 1 has the problem that since the server device performs image data editing, load placed on the server device increases and a response speed of the server device decreases.

In addition, the technique of Patent document 1 has the problem that the editing is not always performed in a manner that the viewer wants since the server device performs the automatic editing process according to the registered predetermined editing procedure.

Suppose, for example, there is a case where viewers want to view a group photograph in which their children appear. In this case, sections which the viewers want to zoom in are different because each of the viewers zooms in on a section of the group photograph where his/her child appears. Regardless of the viewers' desire, the automatic editing is performed. Note that each viewer can download the image from the server device to a terminal device to process and edit the downloaded image so that the image is displayed in a manner that the viewer wants. In this case, the image data stored in the server device is in an original form before processed or edited by the terminal device. That is why the image data needs to be processed or edited afresh when the image data is viewed.

SUMMARY OF THE INVENTION

The present invention has been attained in view of the above problem, and an object of the present invention is to display image display data stored in an image data transmitting device, in a manner that the user wants without increasing load on the image data transmitting device.

In order to solve the above problem, an image display device of the present invention is an image display device which displays on a display section an image corresponding to image display data acquired from an image data transmitting device, the image display device including: an operation receiving section receiving user's operation entry regarding edits of an image displayed on the display section; a data managing section storing operation information in an operation information storage section so that the operation information is associated with the image display data, the operation information being indicative of the operation entry regarding at least part of the edits; and a display control section editing the image corresponding to the image display data on the basis of the operation information corresponding to the image display data, which information is stored in the operation information storage section, so that an edited version of the image can be displayed on the display section.

Here, the image display data may be image data itself, such as image (still image) data, moving image data, text data, or animation data. In addition to such image data, the image display data may include layout data that specifies layout of a display screen for displaying the above image data. The layout data may include image data, such as character string, graphics, patterns, and others, which are displayed together with an image corresponding to the above image data. Further, the edits of the image are manipulations for changing a manner in which an image is displayed on the basis of the image data and/or the layout data. Examples of the edits of the image include: rotation; zoom-in; zoom-out; change of a display position; sideway scrolling and up and down scrolling; change on whether an image (character string, graphics, and others) included in the layout data are to be displayed or hidden; gamma correction; color correction; contrast correction; skin tone correction; angle correction; and red-eye automatic correction, all of which are performed on all or part of an image.

According to the above arrangement, when the operation receiving section receives user's operation entry regarding edits of an image displayed on the display section, the data managing section stores operation information in an operation information storage section so that the operation information is associated with the image display data, which operation information is indicative of the operation entry regarding at least part of the edits. Then, the display control section edits the image corresponding to the image display data on the basis of the operation information corresponding to the image display data, which information is stored in the operation information storage section, so that an edited version of the image can be displayed on the display section.

With this arrangement, at the time of displaying again image display data that has been previously displayed after acquisition of the image display data from the image data transmitting device, it is possible to display the image display data in such a manner that edits previously made on the image display data are reflected. This allows the user to view an image in a display manner that he/she wants, without doing editing operation. Further, the image data transmitting device does not need to edit the image display data. This does not increase load on the image data transmitting device.

Moreover, an edit made by the user is not reflected in the image display data stored in the image data transmitting device. With this arrangement, for example, even if desired display manners are different between a plurality of users who acquire one and the same image display data for display from the image data transmitting device, each of the users can view an image corresponding to the image display data in a display manner that he/she wants.

Further, in order to solve the above problem, the image display device of the present invention is an image display device which displays on a display section an image corresponding to image display data acquired from an image data transmitting device, the image display device including: a data managing section acquiring the image display data and operation information from the image data transmitting device, which operation information is indicative of edits to be applied to the image display data; and a display control section editing the image corresponding to the image display data on the basis of the operation information, so that an edited version of the image can be displayed on the display section.

According to the above arrangement, the data managing section acquires the image display data and operation information from the image data transmitting device, which operation information is indicative of edits to be applied to the image display data, and the display control section edits the image corresponding to the image display data on the basis of the operation information, so that an edited version of the image can be displayed on the display section.

With this arrangement, at the time of displaying the image display data acquired from the image data transmitting device, it is possible to display the image display data in such a manner that an edit indicated in the operation information, which has been acquired together with the image display data from the image data transmitting device, is reflected. This allows the user to view an image in a display manner that he/she prefers, without doing editing operation.

Moreover, for example, the image data transmitting device stores in advance operation information indicative of edits to be applied to the image display data. With this, at the time of transmitting the image display data, the image data transmitting device only needs to transmit the image display data and the operation information corresponding to the image display data. This eliminates the need for editing of the image display data by the image data transmitting device, thus enhancing convenience for the user without increasing load on the image data transmitting device.

In order to solve the above problem, an image data transmitting device of the present invention is an image data transmitting device which transmits image display data to an image display device, and the image data transmitting device includes: a storage section storing therein image display data and operation information being indicative of edits to be applied to an image corresponding to the image display data; and a communication managing section, at a time of transmitting the image display data to the image display device, transmitting the image display data and the operation information corresponding to the image display data.

According to the above arrangement, at the time of transmitting the image display data to the image display device, the communication managing section transmits the image display data and the operation information corresponding to the image display data. With this arrangement, the user who views an image corresponding to the image display data with the use of the image display device, can display the image in such a manner that an edit indicated in the operation information is reflected, without doing editing operation.

Moreover, the image data transmitting device stores in advance in the storage section operation information indicative of edits to be applied to the image display data. With this, at the time of transmitting the image display data, the image data transmitting device only needs to transmit the image display data and the operation information corresponding to the image display data. This eliminates the need for editing of the image display data by the image data transmitting device, thus enhancing convenience for the user without increasing load on the image data transmitting device.

In order to solve the above problem, an image display system of the present invention is an image display system including: an image data transmitting device which transmits image display data to an image display device; and the image display device which displays an image corresponding to the image display data on a display section, the image display device including: an operation receiving section receiving user's operation entry regarding edits of an image displayed on the display section; a data managing section storing operation information in an operation information storage section so that the operation information is associated with the image display data, the operation information being indicative of the operation entry regarding at least part of the edits; and a display control section edits the image corresponding to the image display data on the basis of the operation information corresponding to the image display data, which information is stored in the operation information storage section, so that an edited version of the image can be displayed on the display section.

With this arrangement, at the time of displaying again on the image display device image display data that has been previously displayed after acquisition of the image display data from the image data transmitting device, it is possible to display the image display data in such a manner that edits previously made on the image display data are reflected. This allows the user to view an image in a display manner that he/she wants, without doing editing operation. Further, the image data transmitting device does not need to make an edit on the image display data. This does not increase load on the image data transmitting device.

Moreover, an edit made by the user is not reflected in the image display data stored in the image data transmitting device. With this arrangement, for example, even if desired display manners are different between a plurality of users who acquire one and the same image display data for display from the image data transmitting device, each of the users can view an image corresponding to the image display data in a display manner that he/she wants.

In order to solve the above problem, the image display system of the present invention is an image display system including: an image data transmitting device which transmits image display data to an image display device; and the image display device which displays an image corresponding to the image display data on a display section, the image data transmitting device including: a storage section storing therein image display data and operation information being indicative of edits to be applied to an image corresponding to the image display data; and a communication managing section, at a time of transmitting the image display data to the image display device, transmitting the image display data and the operation information corresponding to the image display data, the image display device including: a data managing section acquiring the image display data and operation information from the image data transmitting device, the operation information being indicative of edits to be applied to the image display data; and a display control section editing the image corresponding to the image display data on the basis of the operation information, so that an edited version of the image can be displayed on the display section.

According to the above arrangement, at the time of transmitting the image display data to the image display device, the image data transmitting device transmits the image display data and the operation information corresponding to the image display data. The image display device edits the image display data acquired from the image data transmitting device on the basis of the operation information so that an edited image can be displayed on the display section. With this arrangement, at the time of displaying the image display data acquired from the image data transmitting device, it is possible to display the image display data in such a manner that an edit indicated in the operation information, which has been acquired together with the image display data from the image data transmitting device, is reflected. This allows the user to view an image in a display manner that he/she prefers, without doing editing operation.

Moreover, the image data transmitting device stores in advance operation information indicative of edits to be applied to the image display data. With this, at the time of transmitting the image display data, the image data transmitting device only needs to transmit the image display data and the operation information corresponding to the image display data. This eliminates the need for editing of the image display data by the image data transmitting device, thus enhancing convenience for the user without increasing load on the image data transmitting device.

In order to solve the above problem, an image display method of the present invention is an image display method of displaying on a display section of an image display device an image corresponding to image display data acquired from an image data transmitting device, the image display method including: an operation receiving step of receiving user's operation entry regarding edits of an image displayed on the display section; and a storing step of storing operation information so that the operation information is associated with the image display data, the operation information being indicative of the operation entry regarding at least part of the edits, wherein: the image corresponding to the image display data, which has been acquired from the image data transmitting device, is edited on the basis of the operation information corresponding to the image display data, which information is stored in the operation information storage section, so that an edited version of the image can be displayed on the display section.

According to the above method, at the time of displaying again on the image display device image display data that has been previously displayed after acquisition of the image display data from the image data transmitting device, it is possible to display the image display data in such a manner that edits previously made on the image display data are reflected. This allows the user to view an image in a display manner that he/she wants, without doing editing operation. Further, the image data transmitting device does not need to make an edit on the image display data. This does not increase load on the image data transmitting device.

Moreover, an edit made by the user is not reflected in the image display data stored in the image data transmitting device. With this arrangement, for example, even if desired display manners are different between a plurality of users who acquire one and the same image display data for display from the image data transmitting device, each of the users can view an image corresponding to the image display data in a display manner that he/she wants.

In order to solve the above problem, an image display method of the present invention is an image display method of displaying on a display section of an image display device an image corresponding to image display data acquired from an image data transmitting device, wherein: at a time of transmission of image display data from the image data transmitting device to the image display device, the image display data and operation information indicative of edits to be applied to an image corresponding to the image display data is transmitted; and the image corresponding to the image display data, which the image display device has acquired from the image data transmitting device, is edited on the basis of the operation information, so that an edited version of the image can be displayed on the display section.

According to the above method, at the time of transmitting the image display data to the image display device, the image data transmitting device transmits the image display data and the operation information corresponding to the image display data. The image display device edits the image display data acquired from the image data transmitting device on the basis of the operation information so that an edited image can be displayed on the display section. With this arrangement, at the time of displaying the image display data acquired from the image data transmitting device, it is possible to display the image display data in such a manner that an edit indicated in the operation information, which has been acquired together with the image display data from the image data transmitting device, is reflected. This allows the user to view an image in a display manner that he/she prefers, without doing editing operation.

Moreover, the image data transmitting device stores in advance operation information indicative of edits to be applied to the image display data. With this, at the time of transmitting the image display data, the image data transmitting device only needs to transmit the image display data and the operation information corresponding to the image display data. This eliminates the need for editing of the image display data by the image data transmitting device, thus enhancing convenience for the user without increasing load on the image data transmitting device.

Note that the image display device may be realized by a computer. In such a case, the scope of the present invention includes an image display program which causes a computer to realize the image display device by causing the computer to operate as the foregoing sections, and a computer-readable storage medium storing the image display program therein.

The image data transmitting device may be realized by a computer. In such a case, the scope of the present invention includes an image data transmission program which causes a computer to realize the image data transmitting device by causing the computer to operate as the foregoing sections, and a computer-readable storage medium storing the image data transmission program therein.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 5(a) and 5(b) are explanatory views illustrating examples of an image display screen creation script used in the image display system according to the embodiment of the present invention.

FIGS. 6(a) and 6(b) are explanatory views illustrating examples of operation information stored in the image display device according to the embodiment of the present invention.

FIGS. 7(a) and 7(b) are explanatory views illustrating examples of operation information stored in the image display device according to the embodiment of the present invention.

DESCRIPTION OF THE EMBODIMENTS

The following will describe one embodiment of the present invention.

Note that media data in the present embodiment is referred to as: any of image (still image) data, moving image data, audio data, music data, text data, and animation data; streaming data or broadcast data received from an external entity; or below-mentioned multimedia data into which the foregoing data are integrated.

The multimedia data in the present embodiment is referred to as data into which at least one media data is integrated. The multimedia data may be described in text format that can be read by humans or may be described in binary format that cannot be read by humans.

Further, a script in the present embodiment is referred to as descriptions that specify attributes of each set of media data included in the multimedia data for display, playback, and editing of the multimedia data. Examples of the attributes include information of layout on a screen, timings of start and end on a time base, playback speed, and sound volume. The script may include control information such as activation of an external application, information acquisition from internal and/or external devices, and link transition to other multimedia data.

A template in the present embodiment is referred to as a form of multimedia data that includes the above-mentioned script and can be played back or edited, wherein media data can be added, changed, and deleted by modifying a description on media data in the script in response to user's operation or the like. The template may include at least one media data referred to by the script.

In the descriptions of the present embodiment, the present invention is applied to a slideshow display system in which slideshow display is performed. Here, the slideshow display is to display in succession slides realized by images included in an image group which consists of a plurality of images (alternatively, images included in an image group which consists of a plurality of images, and character string, graphics, patterns, and others arranged to be displayed with the images) while changing the slides.

(Slideshow Display System 1)

Figure 2:
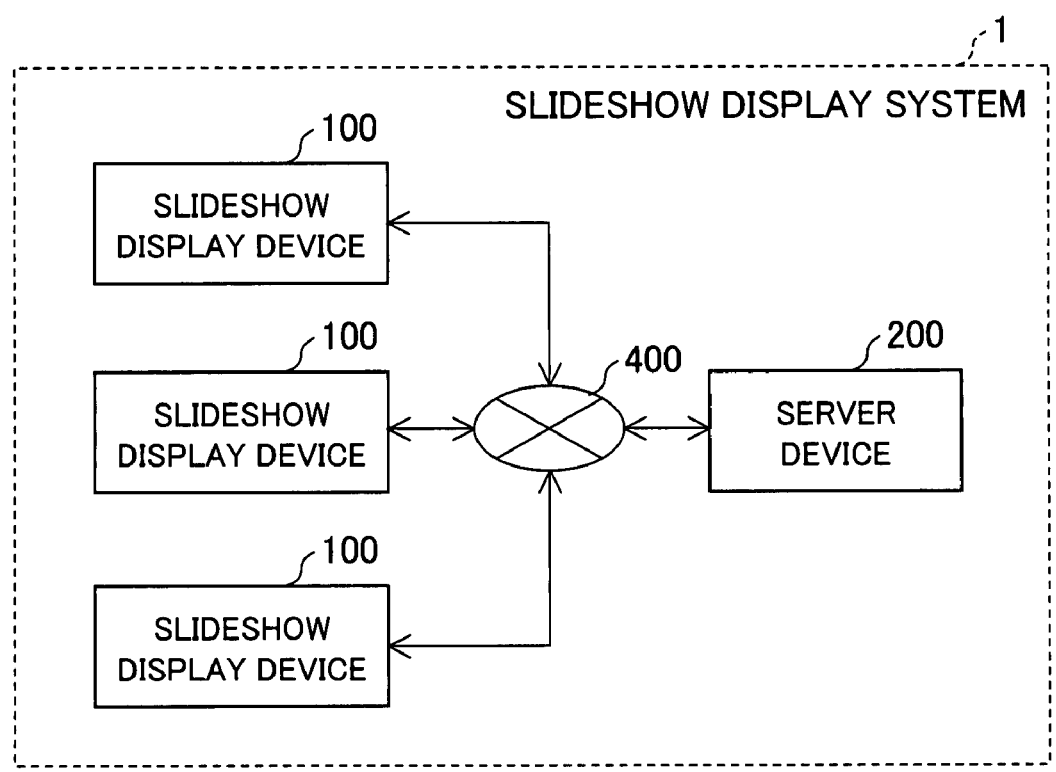
FIG. 2 is a schematic block diagram illustrating schematically the structure of an image display system according to the embodiment of the present invention.

FIG. 2 is an explanatory diagram illustrating schematically the structure of a slideshow display system 1 that is an image display system of the present embodiment. As illustrated in FIG. 2, the slideshow display system (image display system) 1 includes a slideshow display device (image display device) 100, and a server device (image data transmitting device) 200.

The slideshow display device 100 is a terminal device which performs slideshow display. As illustrated in FIG. 2, the slideshow display system 1 can include a plurality of slideshow display devices 100. Each of the slideshow display devices 100 can be realized, for example, with the use of a television receiver and a personal computer installed in a user's home.

As illustrated in FIG. 2, the slideshow display device 100 is connected to the server device 200 via a network 400 such as Internet. The slideshow display device 100 is arranged so as to be able to communicate with the server device 200.

The server device 200 is a device for storing various kinds of data to be transmitted to the slideshow display device 100.

Note that the server device 200 stores therein image data items of respective target images (main images) of slides. The image data of the target image, which is not particularly limited, may be image data captured by image capturing means such as a camera-equipped mobile telephone, a digital camera, or a scanner. Further, the image data captured by the image capturing means may be transmitted from the image capturing means to the server device 200 via wired communication means or wireless communication means, or may be transmitted to the server device 200 via a terminal device such as a personal computer. The image captured by the image capturing means may be stored in various kinds of storage media so that the storage media can be read by reading means stored in the server device 200 or connected to the server device 200.

The server device 200 supplies various kinds of data required for slideshow display to the slideshow display device 100 via the network 400. The server device 200 is installed in a business office of a business owner who operates the slideshow display system 1, for example. Note that although in the present embodiment the server device 200 supplies to the slideshow display device 100 various kinds of data required for slideshow display, the present embodiment is not limited to this arrangement. Alternatively, for example, a relay server device may be provided between the slideshow display device 100 and the server device 200, so that the relay sever device transmits to the slideshow display device 100 various kinds of data required for slideshow display. In this case, part of the various kinds of data may be stored in the relay server device.

The server device 200 manages stored image data by "Album" (image group). Each album, which is a collective entity of a plurality of sets of image data, is assigned album attributes such as an album ID, an album title, a creation date of the album, a person who creates the album, the number of images included in the album.

In order to designate a desired album, the slideshow display device 100 transmits an album ID of the desired album to the server device 200. The server device 200 transmits album information of the album designated by the album ID to the slideshow display device 100.

The album information includes (a) an image data group of thumbnails (reduced images) corresponding to respective images included in the album and (b) a thumbnail list view screen creation script. The thumbnail list view screen creation script stores layout definition information which specifies layout of a thumbnail list view screen. The thumbnail list view screen creation script can be rendered as text data described in XML (Extensible Markup Language). In this case, the layout definition information can be described in SVG (Scalable Vector Graphics), for example. The slideshow display device 100 is arranged so as to create a thumbnail list view screen using the image data group of thumbnails, in accordance with layout definition information included in the obtained thumbnail list view screen creation script.

Note that the image data group and the thumbnail list view screen creation script, which are included in the album information, may be supplied in the form of mutually independent data to the slideshow display device 100. Alternatively, the image data group and the thumbnail list view screen creation script may be supplied in the form of an integrated template including them to the slideshow display device 100.

The slideshow display device 100 determines one of the images included in the album as a target image, and transmits a data acquisition request for acquiring image data of the target image to the server device 200. In response to the data acquisition request, the server device 200 transmits the image data of the target image to slideshow display device 100.

Note that the server device 200 may be arranged so as to transmit an image display screen creation script that stores layout definition information as well as the image data of the target image to the slideshow display device 100. The layout definition information specifies layout of a display screen for displaying the target image. The image display screen creation script can include, for example, data, such as character string, graphics, and patterns, which are displayed together with the image data of the target image (e.g. displayed so as to be superimposed on the target image, or displayed near the target image). In the present embodiment, data including (a) the image data of the target image and (b) the image display screen creation script is referred to as slide data (however, in a case where the image display screen creation script is not used to display the target image, image data of the target image corresponds to slide data (displayed data)).

The image display screen creation script can be rendered as text data described in XML. In this case, the layout definition information included in the image display screen creation script can be described in SVG (Scalable Vector Graphics), for example. In supplying the image data of the target image and the image display screen creation script to the slideshow display device 100, the image data of the target image and the image display screen creation script may be supplied in the form of mutually independent data to the slideshow display device 100. Alternatively, the image data of the target image and the image display screen creation script may be supplied in the form of an integrated template including them to the slideshow display device 100.

The slideshow display device 100 displays the acquired target image for a predetermined time. The slideshow display device 100 determines an image to be displayed next to the currently displayed image as a new target image, and acquires the new target image from the server device 200. When the predetermined time lapses after the start of display of the currently displayed image, the slideshow display device 100 displays the new target image instead of the currently displayed image. By repeating the above operation, the slideshow display device 100 displays a plurality of images included in the album in slideshow. Note that the present embodiment is not limited to the arrangement in which change to a next image is made every time a given time period elapses. Alternatively, change to a next image may be made in response to user's instruction.

As described above, the slideshow display device 100 can perform slideshow display of images included in an album which is managed under the server device 200 at a distant location. If display delay occurs during the slideshow display, the slideshow display device 100 may perform thumbnail list display in accordance with album information acquired from the server device 200.

(Slideshow Display Device 100)

Figure 3:
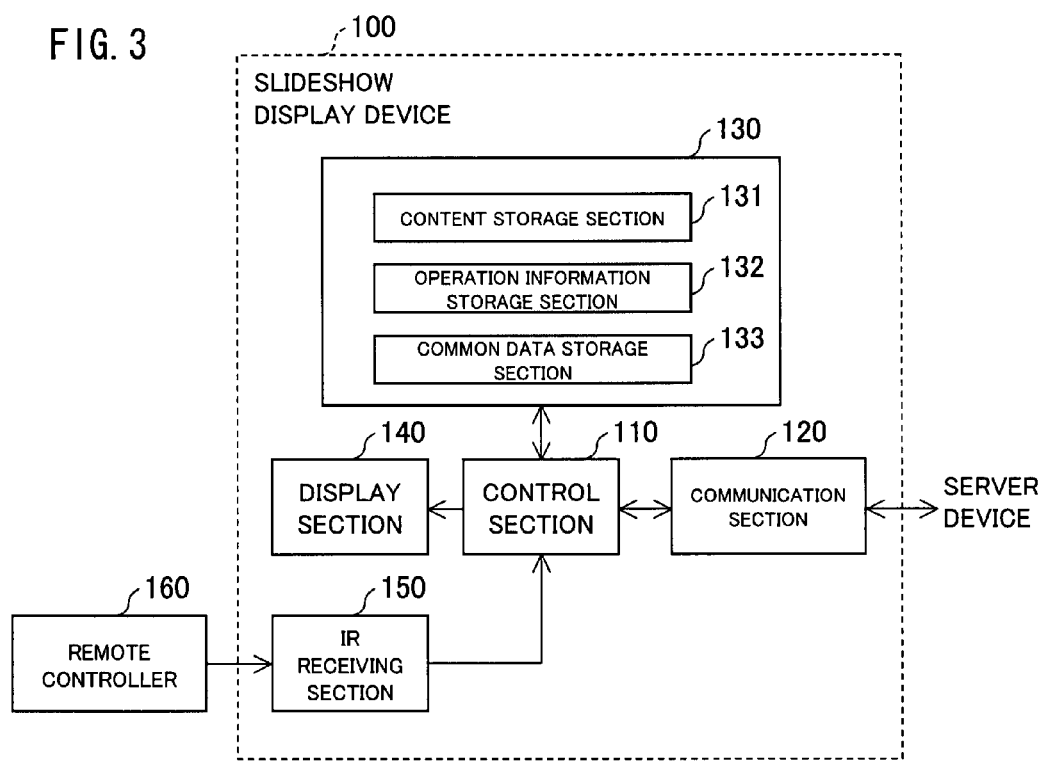
FIG. 3 is a functional block diagram illustrating a primary structure of the image display device according to the embodiment of the present invention.
Figure 4:
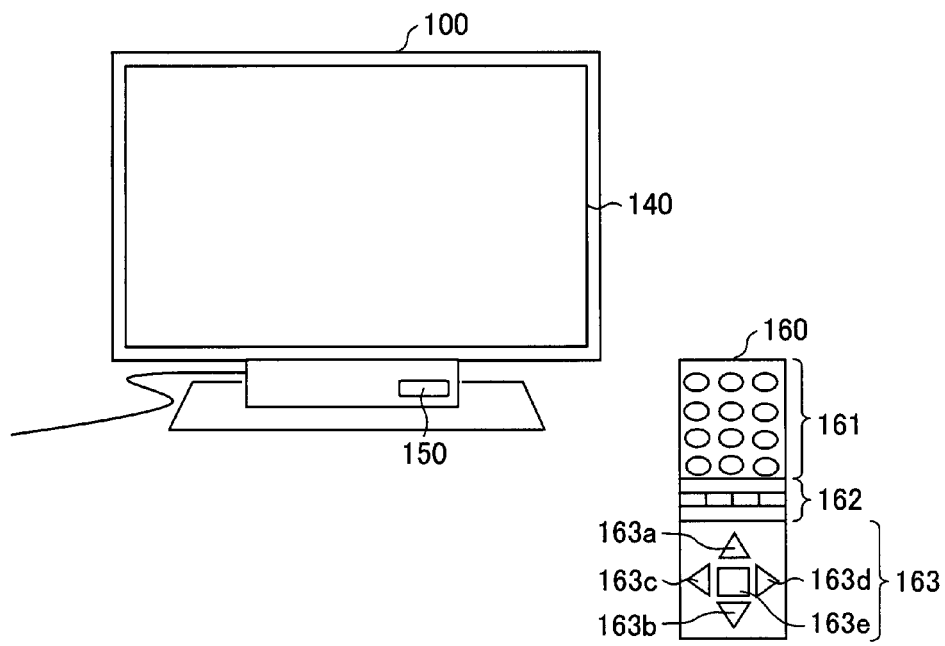
FIG. 4 is an external view of the image display device according to the embodiment of the present invention.

Next, the following will describe a general structure of the slideshow display device 100 with reference to FIGS. 3 and 4. FIG. 3 is a functional block diagram illustrating a primary structure of the slideshow display device 100. FIG. 4 is an external view illustrating an outward appearance of the slideshow display device 100.

As illustrated in FIG. 3, the slideshow display device 100 includes a control section 110, a communication section 120, a storage section 130, a display section 140, an IR receiving section 150, a content storage section 131, and an operation information storage section 132. The slideshow display device 100 operates in response to the instructions entered into the remote controller 160 by a user.

The communication section 120 is a communication interface through which transmission and reception of various kinds of data with the server device 200 are performed. The control section 110 can exchange data with the server device 200 through the communication section 120.

The storage section 130 is a storage device such as memory. The storage section 130 includes the content storage section 131, the operation information storage section 132, and a common data storage section 133. The content storage section 131 stores therein data regarding slideshow, which is acquired from the server device 200. The operation information storage section 132 stores therein operation information indicative of the content of operation entered by the user. The common data storage section 133 stores in advance various kinds of data for common use in slideshow display. The control section 110 causes the content storage section 131 and the operation information storage section 132 of the storage section 130 to store data acquired from the server device 200 through the communications section 120 and operation information entered by the user, respectively. The control section 110 can read the data stored in the storage section 130 at a given point in time to use them.

The IR receiving section 150 is a communication interface through which infrared data communications with the remote controller 160 are performed. The remote controller 160 transmits a signal indicative of what operation has been accepted from the user, to the IR transmitting section 150 on an infrared carrier wave. The control section 110 performs various kinds of information processing in accordance with the signal acquired through the IR receiving section 150.

Main information processing performed by the control section 110 is to generate various kinds of display screens on the basis of data acquired through the communication section 120, instruction entered by the user, data stored in the storage section 130, and others, and to present the display screens on the display section 140. The function of the control section 110 will be described in detail later.

As illustrated in FIG. 4, the slideshow display device 100 can be realized with the use of a television receiver, for example. If the slideshow display device 100 is realized with the use of a television receiver, a display panel (display screen) included in the television receiver can be used as the display section 140 for powerful slideshow display. Note that a display principle of the television receiver is not particularly limited. For example, the television receiver may be a liquid crystal display device, a CRT display device, a plasma display device, or an organic electroluminescent display device. Further, the slideshow display device 100 can be realized as a personal computer.

FIG. 4 also illustrates an example of the structure of the remote controller 160. In FIG. 4, the remote controller 160 includes a numeric button section 161 and a cross button section 163.

As illustrated in FIG. 4, the numeric button section 161 includes numeric buttons corresponding to at least 0 to 9. The user enters any digit numbers by pressing the buttons as required. The command button section 162 includes command buttons such as a "menu" button and "return" button. According to the progress of the processing in the slideshow display device 100, the command buttons are associated with commands selectable at that time. By pressing any of the command buttons, the user enters a command associated with the pressed button among the commands selectable at that time. For example, the menu button is associated with a command for displaying menu dialogs. The return button is associated with a command for hiding menu dialogs. The cross button section 163 includes four buttons (upward button 163a, downward button 163b, left button 163c, and right button 163d) respectively corresponding to upward, downward, left, and right directions and an enter button 163e, which is surrounded by the four buttons. By pressing the buttons 163a through 163d, the user points at a desired object among objects displayed on the display section 140. By pressing the enter button 163e, the user selects an object at which the user currently points. For example, the user selects a desired image from among thumbnails displayed in list view and selects a desired menu from among the menu dialogs which are displayed with the press of the menu button. The buttons 163a through 163e included in the cross button section 163 can be associated with functions other than the functions of pointing at and selecting an object, according to the progress of the processing in the slideshow display device 100. For example, during the slideshow display, the right button 163d is associated with a command for displaying an image next to the currently displayed image. The left button 163c is associated with a command for displaying an image previous to the currently displayed image. The enter button 163e corresponds to a command for starting a slideshow display application, a command for suspending a slideshow, or a command for resuming a slideshow.

(Control Section 110)

Next, the following will describe the control section 110 included in the slideshow display device 100.

Figure 1:
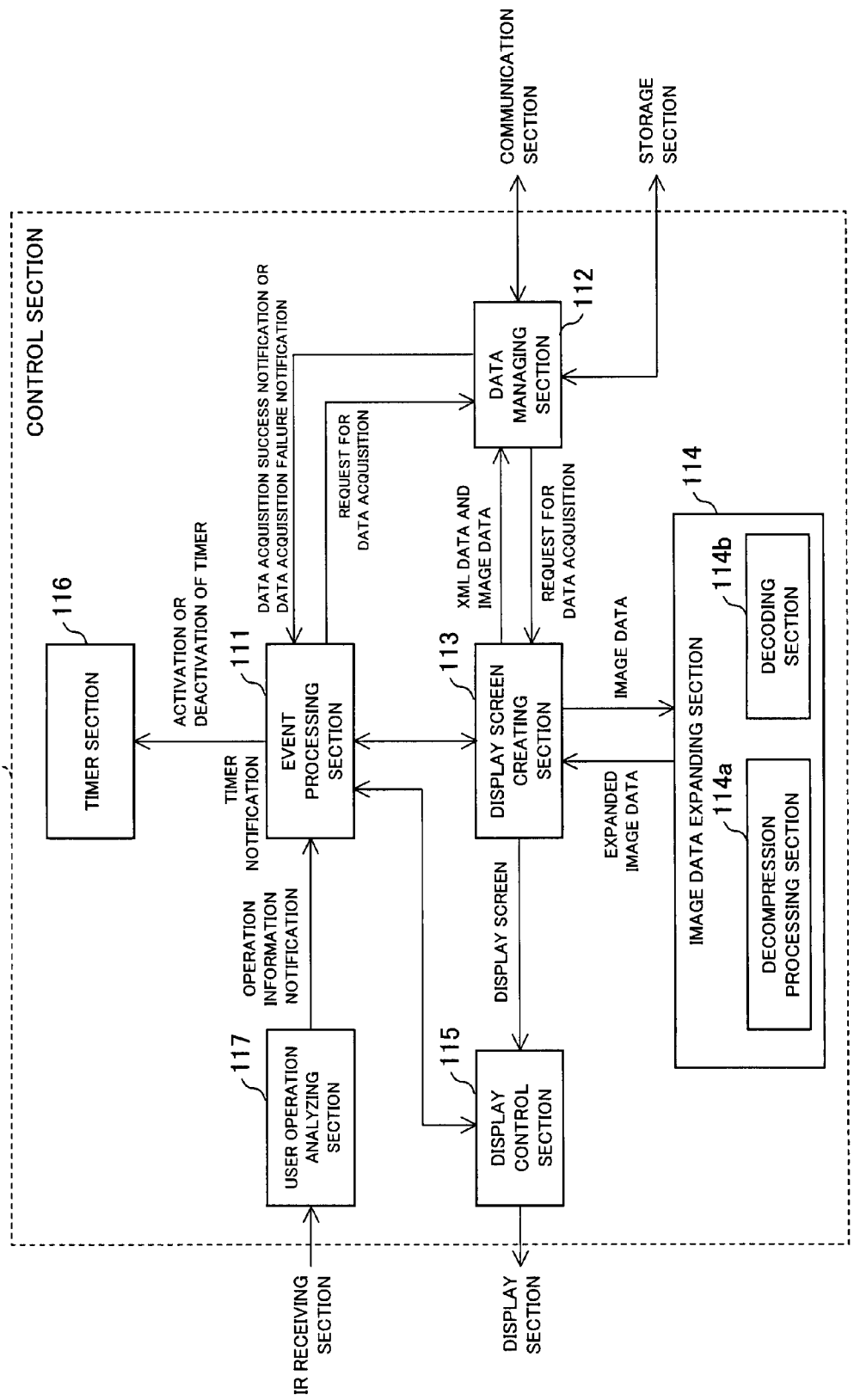
FIG. 1 is a An illustration of the embodiment of the present invention and a functional block diagram illustrating the structure of a control section included in an image display device according to an embodiment of the present invention.

FIG. 1 is a functional block diagram illustrating the structure of the control section 110 included in the slideshow display device 100. As illustrated in FIG. 1, the control section 110 includes an operation information reflecting section (event processing section) 111, a data managing section 112, a display screen creating section 113, an image data expanding section 114, a display control section 115, a timer section 116, and an operation information generating section (operation receiving section) 117.

The data managing section 112 is a block which performs a process for acquiring various kinds of data from the server device 200 and a process for storing various kinds of data in the storage section 130 and reading the data from the storage section 130. The data acquired by the data managing section 112 include: slide data of a slide to be displayed in slideshow display; and image data of a thumbnail to be displayed in thumbnail list display. The slide data includes at least image data of a target image (main image). In the server device 200 transmitting to the slideshow display device 100 the image data of the target image and the image display screen creation script, the image data of the target image and the image display screen creation script are included in the slide data.

FIGS. 5(a) and 5(b) illustrates examples of the image display screen creation script. As illustrated in FIGS. 5(a) and 5(b), the image display screen creation script may include slide attribute information (e.g. a name of a slide, a creator, and a creation date), information for acquiring image data of a target image from the server device 200 (e.g. path information which specifies a place where the image data of the target image is stored), information regarding a character string, graphics, a pattern which are displayed with the target image (e.g. display location, shape, and color of the target image), and information regarding change to a next slide.

In response to the instruction from the operation information reflecting section 111, the data managing section 112 transmits a data acquisition request for acquiring required data to the server device 200 through the communication section 120. If succeeding in acquiring the data, the data managing section 112 notifies the operation information reflecting section 111 of a data acquisition success notification. If failing in acquiring the data, the data managing section 112 notifies the operation information reflecting section 111 of a data acquisition failure notification. The data managing section 112 causes the content storage section 131 of the storage section 130 to store various data acquired from the server device 200 and reads required data where appropriate.

Further, in response to the instruction from the operation information reflecting section 111, the data managing section 112 stores in the operation information storage section 132 of the storage section 130 (a) operation information generated by the operation information generating section 117 in accordance with a user's operation regarding editing of slide data so as to associate the operation information with the slide data. Still further, in response to the instruction from the operation information reflecting section 111, the data managing section 112 reads information stored in the operation information storage section 132 as appropriate.

FIG. 6(a) is an explanatory view illustrating an example of operation information stored in the operation information storage section 132. More specifically, FIG. 6(a) illustrates an example of operation information in a case when in an album corresponding to an album ID "1234-5678-9012-3456", a target image of a first slide (slide ID "2_slide0") is rotated by 90 degrees once and zoomed in by 120% twice, and a target image of a second slide (slide ID "2_slide1") is rotated by 90 degrees twice. As illustrated in FIG. 6(a), the operation information stored in the operation information storage section 132 includes an album ID, a slide ID, and edits to be made on a slide.

In a case where one edit has been made a plurality of times, a result in which the plural-time edits are reflected may be stored. Take edits shown in FIG. 6(a) as an example. As illustrated in FIG. 6(b), two-time zoom-in on the target image of the first slide may be integrated into one-time 144%-zoom-in. two-time 90-degree rotation of the target image of the second slide may be integrated into one-time 180-degree rotation. This makes it possible to reduce the size of operation information to be stored in the operation information storage section 132.

In the above descriptions, the operation information indicative of edits (rotation, zoom-in) having been made on a target image of each slide is stored in the operation information storage section 132. However, the present invention is not limited to this arrangement. For example, operation information indicative of edits having been made on character string, graphics, patterns, and others, which are displayed together with the target image, may be stored with the operation information indicative of the edits having been made on the target image. Alternatively, the operation information indicative of the edits having been made on character string, graphics, patterns, and others may be stored, instead of the operation information indicative of the edits having been made on the target image.

Further, of edits made on a slide (target image and/or character string, graphics, patterns, and others which are displayed with the target image), only information of a predetermined edit may be arranged to be stored, and information of a predetermined edit may be arranged so as not to be stored. As an example, take a case where a slide with the slide ID "2_slide0" in an album corresponding to the album ID "1234-5678-9012-3456" is displayed in such a manner that only a target image is rotated by 90 degrees, the target image and characters superimposed on the target image are zoomed in by 120%, and the target image and the characters are further zoomed in by 120%. As illustrated in FIG. 7(a), these rotation operation and the zoom-in operation may be stored as the operation information. Alternatively, as illustrated in FIG. 7(b), only the rotation operation may be stored as the operation information. In the case of the arrangement in FIG. 7(b), operation other than the rotation operation, i.e. the zoom-in operation is filtered so as not to be stored.

In the above descriptions, take rotation operation and zoom-in operation as examples of the operation information to be stored in the operation storage section 132. However, the present invention is not limited to this. The operation information to be stored in the operation storage section 132 may be: for example, rotation; zoom ratio (zoom-in/zoom-out) change; change of a display position (sideway scrolling and up and down scrolling); change on whether character string, graphics, patterns, and others are to be displayed or not; corrections including gamma correction, color correction, and contrast correction; and change of image correction parameters including skin tone correction, angle correction, and red-eye automatic correction, all of which are performed on all or part of a slide. By storing the zoom-in operation and change of a display position, for example, operation for zooming in on an image of a particular person who appears in a group photograph can be stored as the operation information.

The display screen creating section 113 is a block for creating various kinds of display screens which are displayed on the display section 140. The display screens created by the display screen creating section 113 include: a display screen on which a target image is displayed in slideshow display (or target screen, character string, graphics, pattern, and others); and a display screen on which thumbnails are displayed in list view during thumbnail display. The display screen creating section 113 obtains various kinds of data required for creation of a display screen from the data managing section 112. The data managing section 112 reads from the storage section 130 various kinds of data for which the display screen creating section 113 has requested, and transmits the read data to the display screen creating section 113.

The display screen creating section 113 creates various kinds of display screens on the basis of the data obtained from the data managing section 112 and instruction from the operation information reflecting section 111, and transmits the created display screens to the display control section 115. The display control section 115 is a block for causing the display section 140 to display various kinds of display screens thereon. In response to instructions from the operation information reflecting section 111, the display control section 115 controls the display section 140 to display thereon the display screens created by the display screen creating section 113.

The image data expanding section 114 is a block for immediately expanding image data of a target image to be displayed to its displayable form. The image data expanding section 114 includes a decompression processing section 114a and a decoding section 114b. In a case where data of a target image (or target screen, character string, graphics, pattern, and others) is compressed data, the decompression processing section 114a decompress the image information to obtain its original information. Meanwhile, in a case where data of a target image (or target screen, character string, graphics, pattern, and others) is encoded data, the decoding section 114b decodes the encoded data.

The timer section 116 transmits a timer notification to the operation information reflecting section 111 when a predetermined time lapses after the timer section 116 is started. When the operation information generating section 117 detects the occurrence of user's operation through the IR receiving section 150, the operation information generating section 117 transmits an operation information notification to the operation information reflecting section 111. The operation information notification indicates the contents of the user's operation.

The operation information reflecting section 111 manages an operation execution timing of the control section 110 in accordance with the foregoing various kinds of notifications, which are notified by the data managing section 112, the timer section 116, and the operation information generating section 117.

(Server Device 200)

Figure 8:
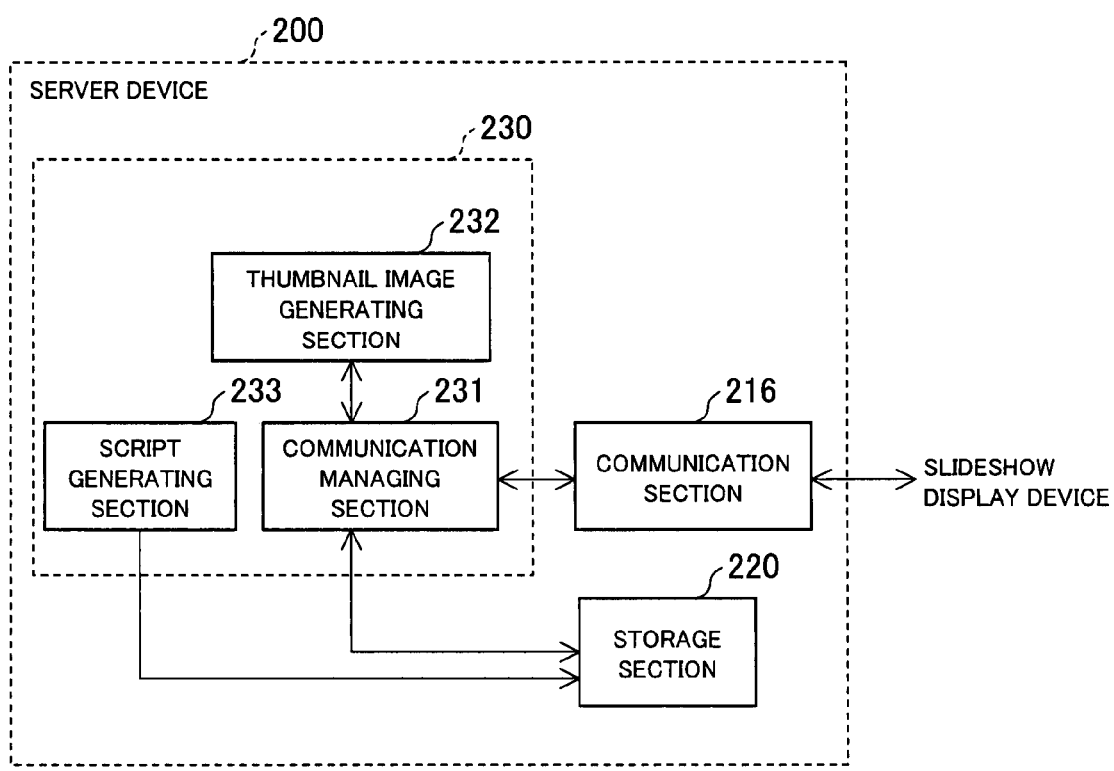
FIG. 8 is a functional block diagram schematically illustrating the structure of a server device included in the image display system according to the embodiment of the present invention.

FIG. 8 is a functional block diagram illustrating a primary structure of the server device 200. As illustrated in FIG. 8, the server device 200 includes a communication section 216, a storage section 220, and a control section 230. The communication section 216 is a communication interface for transmitting and receiving data to and from the slideshow display device 100. The storage section 220 is the one for storing various kinds of data and image data which are acquired through the communication section 216. The control section 230 creates various kinds of data to be supplied to the slideshow display device 100 and transmits the created data to the slideshow display device 100.

The control section 230 includes a communication managing section 231, a thumbnail image generating section 232, and a script generating section 233.

The communication managing section 231 manages image data stored in the storage section 220 album by album. More specifically, the communication managing section 231 generates album management information for each album and stores the generated album management information into the storage section 220. The album management information includes album attributes such as album ID, album title, creation date of album, and person who creates album. In addition, the album management information includes path information which specifies a place where various kinds of data required for slideshow display of the slideshow display device 100 are stored. More specifically, the album management information includes an image data group of images included in an album, an image data group of thumbnails corresponding to the respective images included in the album, and path information such as a thumbnail list view screen creation script and an image display screen creation script.

The image data of thumbnails are generated by the thumbnail image generating section 232 and stored in the storage section 220. Various kinds of scripts such as a thumbnail list view screen creation script and an image display screen creation script are generated by the script generating section 233 and stored in the storage section 220.

The communication managing section 231 receives various data acquisition requests transmitted from the slideshow display device 100. According to an received data acquisition request, the communication managing section 231 transmits to the slideshow display device 100 an image data group of images included in an album, an image data group of thumbnails corresponding to the respective images included in the album, a thumbnail list view screen creation script, and an image display screen creation script.

More specifically, upon receipt of the album information acquisition request, the communication managing section 231 reads from the storage section 220 album management information of an album having an album ID which is designated in the album information acquisition request. The communication managing section 231 reads image data of thumbnail image and a thumbnail list view screen creation script from the storage section 220 with reference to the album management information, and then transmits the read image and script as album information to the slideshow display device 100. Upon receipt of a slide data acquisition request, the communication managing section 231 reads from the storage section 200 slide data (image data of a target image, or both image data of a target image and an image display screen creation script) corresponding to an slide ID designated in the slide data acquisition request, with reference to album management information, and then transmits the read image data to the slideshow display device 100. Note that a more specific method of processing various scripts in the present embodiment is disclosed in Japanese Unexamined Patent Publication No. 343683/2004 (Tokukai 2004-343683), for example.

(Flow of the Procedure in the Control Section 110)

Figure 9:
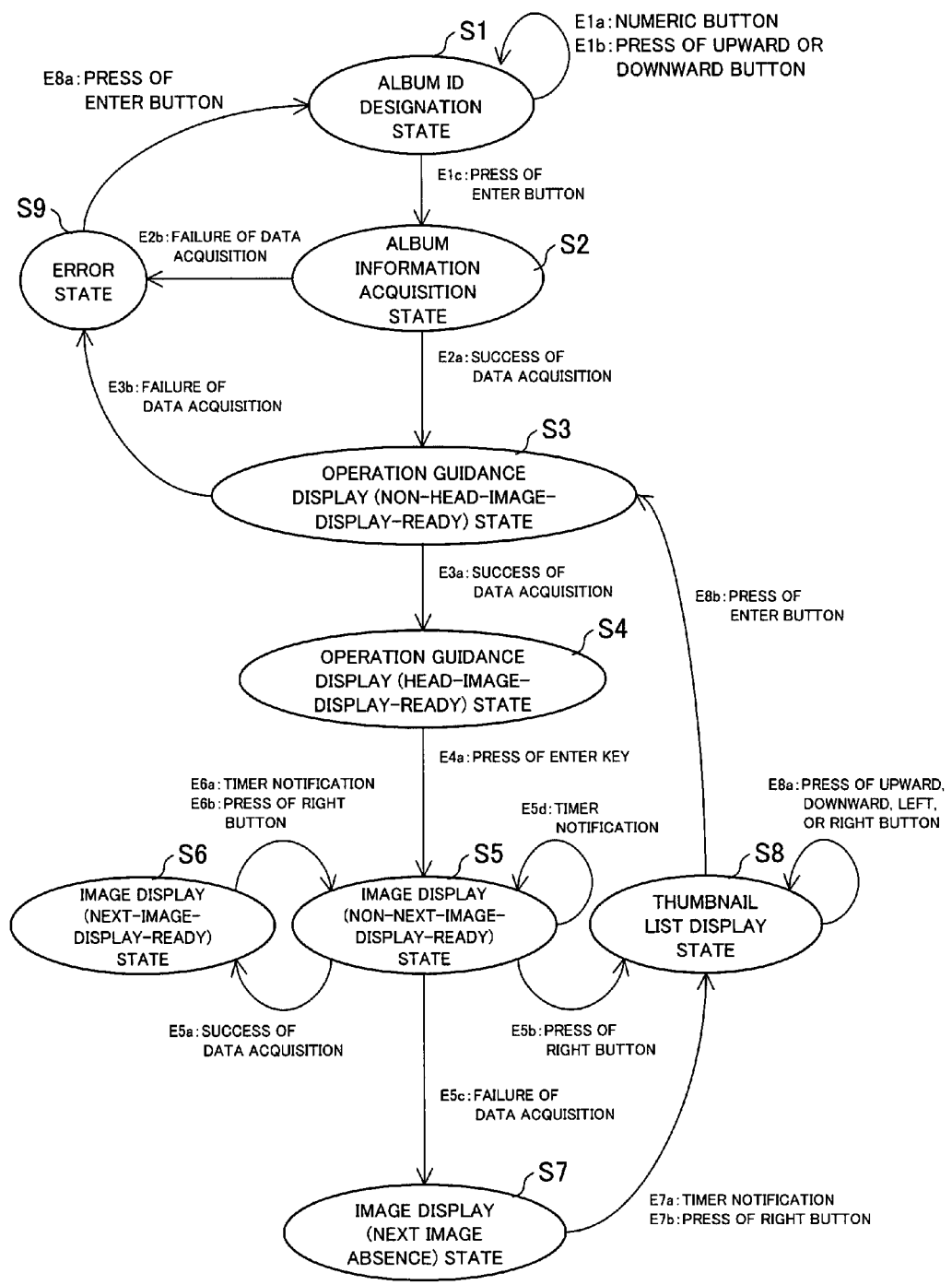
FIG. 9 is an explanatory view illustrating operations of the control section of the image display device according to the embodiment of the present invention.

FIG. 9 is a state transition diagram showing summary of the operations of the operation information reflecting section 111 of the slideshow display device 100. As illustrated in FIG. 9, as states that can be taken by the operation information reflecting section 111, the following nine states are defined in advance: an album ID designation state S1; an album information acquisition state S2; an operation guidance display (non-head-image-display-ready) state S3; an operation guidance display (head-image-display-ready) state S4; an image display (non-next-image-display-ready) state S5; an image display (next-image-display-ready) state S6; an image display (next image absence) state S7; a thumbnail list display state S8; and an error state S9. The operation information reflecting section 111 takes any one of the nine states at each point in time.

Album ID Designation State S1

The album ID designation state S1 is a state causing the user to designate an album ID. In the album ID designation state S1, the display control section 115 causes the display section 140 to display thereon a display screen 600 illustrated in FIG. 10(a) or a display screen 600' illustrated in FIG. 10(b), for example. For example, the display screen 600 and the display screen 600' can be created by the display screen creating section 113 in accordance with a script stored in advance in the storage section 130 and described in SVG.

Figure 10A:
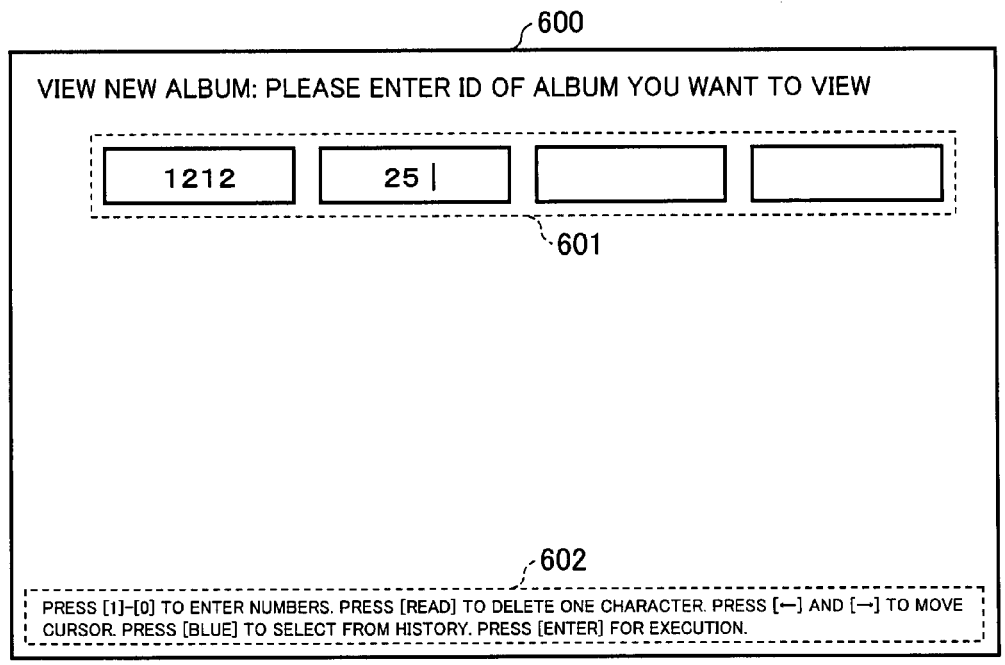
FIGS. 10(a) and 10(b) are explanatory views illustrating examples of the structure of a display screen shown during an album ID designation state in the image display device according to the embodiment of the present invention.

The display screen 600 illustrated in FIG. 10(a) is a display screen that urges the user to enter an album ID of an album that the user wants. The display screen 600 includes an album ID display area 601 where an album ID entered by the user is displayed, and an available command display area 602 where commands that the user can enter are displayed in list view. The user can enter an album ID by pressing the numeric button section 161 of the remote controller 160 while seeing numbers entered by the user and displayed on the album ID display area 601. Further, the user can enter a command displayed in the available command display area 602 by pressing an appropriate button of the remote controller 160. For example, at the press of the enter button 163e, a user can designate a number displayed at that time in the album ID display area 601, as an album ID of an album that the user wants.

Figure 10B:
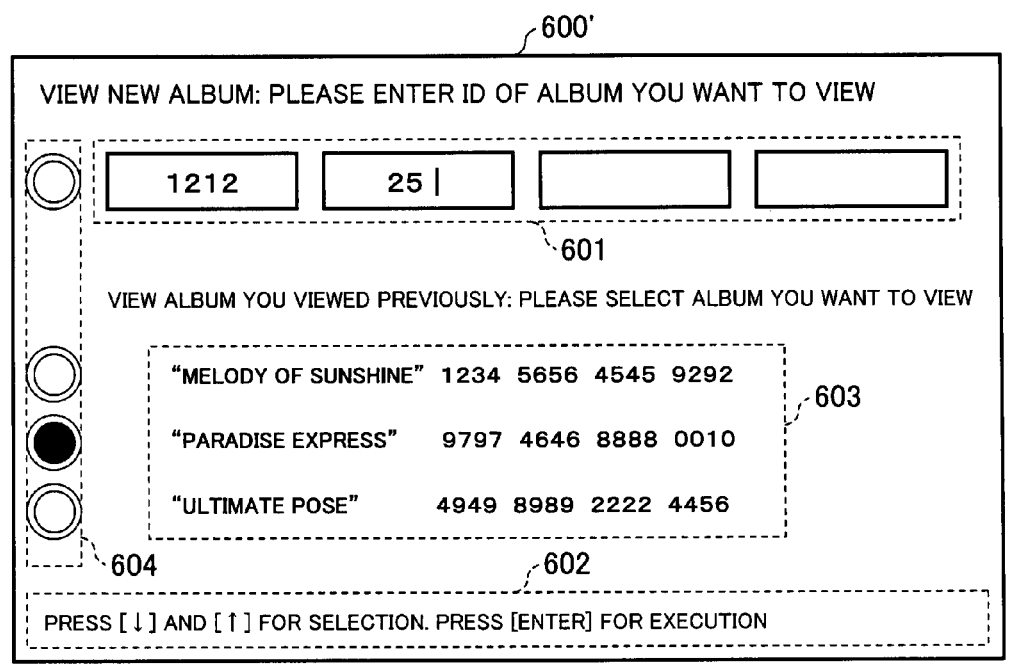

The display screen 600' illustrated in FIG. 10(b) includes not only the album ID display area 601 and the available command display area 602, but also a viewed album list 603 and an indicator group 604. The viewed album list 603 is a list of album titles of albums that the user viewed in the past. The indicator group 604 is a group of indicators respectively corresponding to the album titles listed in the viewed album list 603. In a situation where it is about to accept an album ID entered by pressing the numeric button section 161, an indicator corresponding to the album ID display area 601 is highlighted. In a situation where any of the album titles of the viewed album list 603 is selected, an indicator corresponding the selected album title is highlighted. The user can select a desired album title from among the album titles listed in the viewed album list 603 by pressing the upward button 163a and the downward button 163b, instead of entering a new album ID in the album ID display area 601. By pressing the enter button 163e after selecting a desired album title, the user can designate as a desired album ID an album ID of the album title selected at that time.

The operation information reflecting section 111 waits for an event notification in a state where the above-mentioned display screen is displayed. Events to which the operation information reflecting section 111 responses in the album ID designation state S1 are an event E1a that is a press of the numeric button section 161, an event E1b that is a press of the upward button 163a or the downward button 163b, and an event E1c that is a press of the enter button 163e.

Upon detecting the press of the numeric button section 161 of the remote controller 160, the operation information generating section 117 transmits to the operation information reflecting section 111 an operation information notification that is a notification of the occurrence of the event E1a. Upon receipt of the operation information notification, the operation information reflecting section 111 updates an album ID in accordance with the pressed number. The operation information reflecting section 111 instructs the display control section 115 to update a display screen. Upon receipt of the instruction, the display control section 115 controls the display section 140 to display an updated album ID in the album ID display area 601.

Upon detecting the press of the upward button 163a or the downward button 163b of the remote controller 160, the operation information generating section 117 transmits to the operation information reflecting section 111 an operation information notification that is a notification of the occurrence of the event E1b. The operation information notification includes information indicative of which button of the upward button or the downward button has been pressed. Upon receipt of the operation information notification, the operation information reflecting section 111 updates an album selection state information according to the type of the pressed button. The album selection state information indicates which album is selected among the albums listed in the viewed album list 603. Further, the operation information reflecting section 111 instructs the display control section 115 to update a display screen. Upon receipt of the instruction, the display control section 115 refreshes the radio button group 604 so that a radio button corresponding to a currently selected album is highlighted in accordance with the album selection state information.

Upon detecting the press of the enter button 163e of the remote controller 160, the operation information generating section 117 transmits to the operation information reflecting section 111 an operation information notification that is a notification of the occurrence of the event E1c. Upon receipt of the operation information notification, the operation information reflecting section 111 causes transition from the album ID designation state S1 to the album information acquisition state S2. Thereafter, the operation information reflecting section 111 instructs the data managing section 112 to acquire album information of an album having an album ID designated by the user. In a case where the user selects an album from among the albums listed in the viewed album list 603, the data managing section 112 determines the user-designated album ID in accordance with the above-mentioned album selection state information. The data managing section 112 transmits to the server device 200 an album information acquisition request for acquiring album information. The album information acquisition request includes at least a user-designated album ID as information. In response to the album information acquisition request, the server device 200 transmits album information of the user-designated album to the data managing section 112.

Album Information Acquisition State S2

Figure 11:
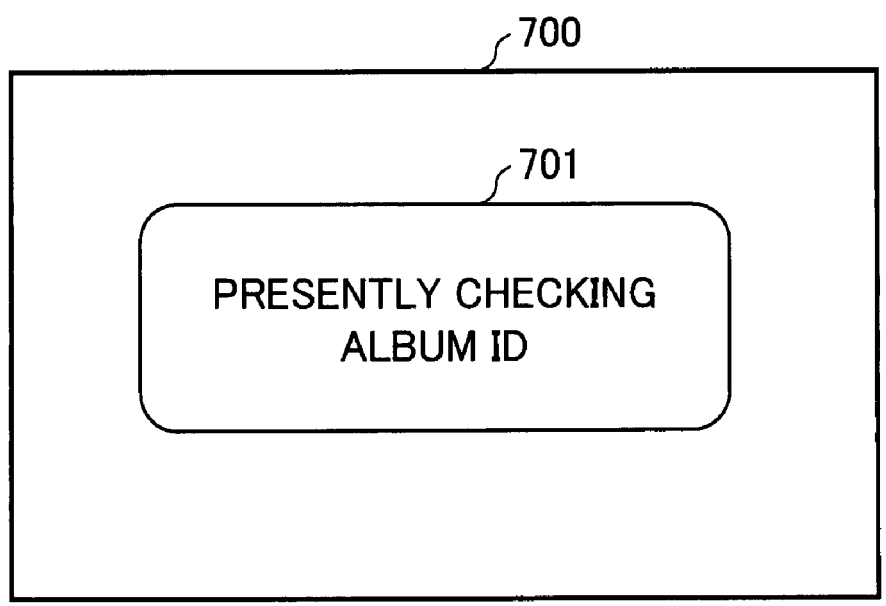
FIG. 11 is an explanatory view illustrating an example of the structure of a display screen shown during an album information acquisition state in the image display device according to the embodiment of the present invention.

The album information acquisition state S2 is a state waiting for a response of the server device 200 to the previously transmitted album information acquisition request. In the album information acquisition state S2, the display control section 115 causes a display screen 700 illustrated in FIG. 11, for example, to be displayed on the display section 140. The display screen 700 can be created by the display screen creating section 113 in accordance with a script stored in advance in the storage section 130 and described in SVG. The display screen 700 is a display screen to inform to a user that the process for acquiring album information is in progress. The display screen 700 includes an appropriate character string 701 such as "PRESENTLY CHECKING ALBUM ID".

In the album information acquisition state S2, the operation information reflecting section 111 waits for the event E2a that the data managing section 112 has succeeded in acquiring album information or the event E2b that the data managing section 112 has failed in acquiring album information. Upon completion of acquisition of album information transmitted from the server device 200 as a response to the album information acquisition request, the data managing section 112 transmits to the operation information reflecting section 111 data acquisition success notification that is a notification of the occurrence of the event E2a. Upon receipt of the data acquisition success notification, the operation information reflecting section 111 causes transition to the operation guidance display (non-head-image-display-ready) state S3. After the transition to the operation guidance display (non-head-image-display-ready) state S3, the operation information reflecting section 111 instructs the data managing section 112 to acquire slide data of a head slide of the user-designated album. The data managing section 112 transmits to the server device 200 a head slide acquisition request. The head slide acquisition request is a request for acquiring slide data of a head slide of an album.

Note that the target image (head image) of the head slide of the album may be an image such as a photograph, or may be an image composed of only character information including an album title and/or a creator's name. In a case where the head image is composed of character information only, the data for displaying the head image may be a head image display screen creation script described in SVG which script includes (i) character information of the head image and (ii) layout definition information that defines layout of the character information. Further, in a case where the head image is an image such as a photograph, the data for displaying the head image may be image data of the head image or may be both the image data of the head image and a head image display screen creation script which includes layout definition information that defines layout of a display screen for display of the head image.

Further, the operation information reflecting section 111 instructs the display screen creating section 113 to create a thumbnail list view screen. The display screen creating section 113 creates the thumbnail list view screen to display a list of thumbnails of a thumbnail image data group on the display section 140, in accordance with a thumbnail list view screen creation script included in the acquired album information. The thus created thumbnail list view screen is drawn off-screen in an image buffer so as to be displayed on the display section 140 at the time of transition to the thumbnail list display state S8. The thumbnail list display state S8 will be described later.

In a case where there is no response from the server device 200 within a predetermined time period after the transmission of the album information acquisition request, the data managing section 112 transmits to the operation information reflecting section 111a data acquisition failure notification that is a notification of the occurrence of the event E2b. Further, the data managing section 112 also transmits the data acquisition failure notification to the operation information reflecting section 111 in a case where the data managing section 112 receives from the server device 200 error information as a response to the album information acquisition request. Examples of a situation that requires the server device 200 to transmit error information includes a situation in which an album of the user-designated album ID is not under the management of the server device 200. Upon receipt of any of the data acquisition failure notifications, the operation information reflecting section 111 causes transition to the error state S9. The error state S9 will be described later.

Operation Guidance Display (Non-Head-Image-Display-Ready) State S3

Figure 12A:
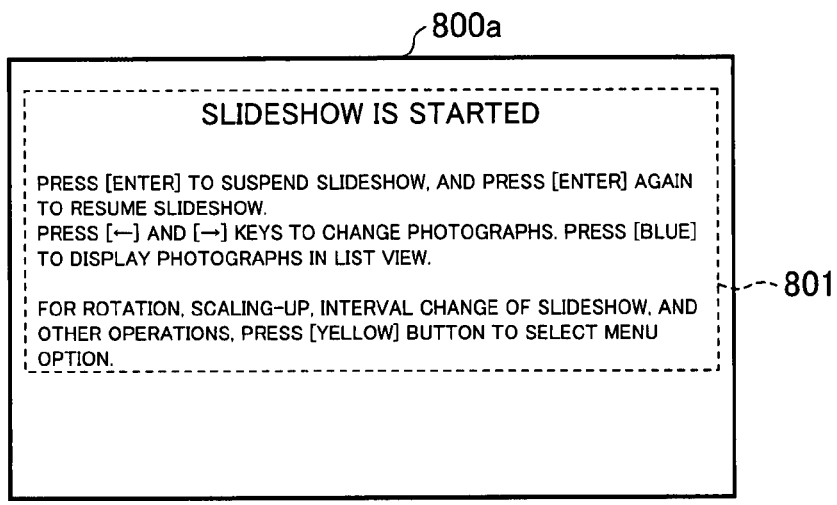
FIG. 12(a) is an explanatory view illustrating an example of the structure of a display screen shown during an operation guidance display (non-head-image-display-ready) state in the image display device according to the embodiment of the present invention.

The operation guidance display (non-head-image-display-ready) state S3 is a state waiting for a response of the server device 200 to the head slide acquisition request (in the case of transition from S2 to S3), or waiting for a response of the server device 200 to the selected slide acquisition request (in the case of transition from S8 to S3), while displaying an operation guidance. In the operation guidance display (non-head-image-display-ready) state S3, the display control section 115 causes the display section 140 to display a display screen 800a illustrated in FIG. 12(a), for example, thereon. For example, the display screen 800 can be created by the display screen creating section 113 in accordance with a script stored in advance in the storage section 130 and described in SVG.

A display screen 800a is a display screen for showing operation guidance. The display screen 800a includes an operation guidance character string 801 representing operation guidance. Thus, the display of the display screen 800a representing operation guidance before the start of a slideshow can avoid a user from being subject to stress when it takes much time to acquire a head slide or slide data of a selected slide.

In the operation guidance display (non-head-image-display-ready) state S3, the operation information reflecting section 111 waits for an event E3a that the data managing section 112 has succeeded in acquiring slide data of a head slide or an event E3b that the data managing section 112 has failed in acquiring slide data of a head slide.

Upon completion of acquisition of slide data of a head slide (selected slide) transmitted from the server device 200 as a response to the head slide (selected slide) acquisition request, the data managing section 112 transmits to the operation information reflecting section 111 data acquisition success notification that is a notification of the occurrence of the event E3a. Upon receipt of the data acquisition success notification, the operation information reflecting section 111 instructs the display screen creating section 113 to create a display screen for displaying an acquired head slide (selected slide) on the display section 140.

In response to the instruction, the display screen creating section 113 creates a display screen for displaying the head slide (selected slide) on the display section 140, and draws the created display screen off-screen. In a case where the script for image display is used to display a head slide, the display screen creating section 113 creates a display screen in accordance with layout definition information of the script, and draws the created display screen off-screen. The display screen creating section 113 creates a display screen in accordance with previous operation information of the user with respect to the head slide (selected slide) which information is stored in the operation information storage section 132, and then draws the created display screen off-screen, which will be described in detail later. Further, in a case where the acquired head slide (selected slide) is in the form of compressed image data, the display screen creating section 113 instructs the decompression processing section 114a of the image data expanding section 114 to expand the compressed image data. Still further, in a case where the acquired head slide (selected slide) is in the form of encoded image data, the display screen creating section 113 instructs the decoding section 114b of the image data expanding section 114 to expand the encoded image data. In response to these instructions, the image data expanding section 114 immediately expands the acquired image data into a displayable form. After the display screen creating section 113 draws the display screen off-screen, the operation information reflecting section 111 causes transition to the operation guidance display (head-image-display-ready) state S4.

Figure 12B:
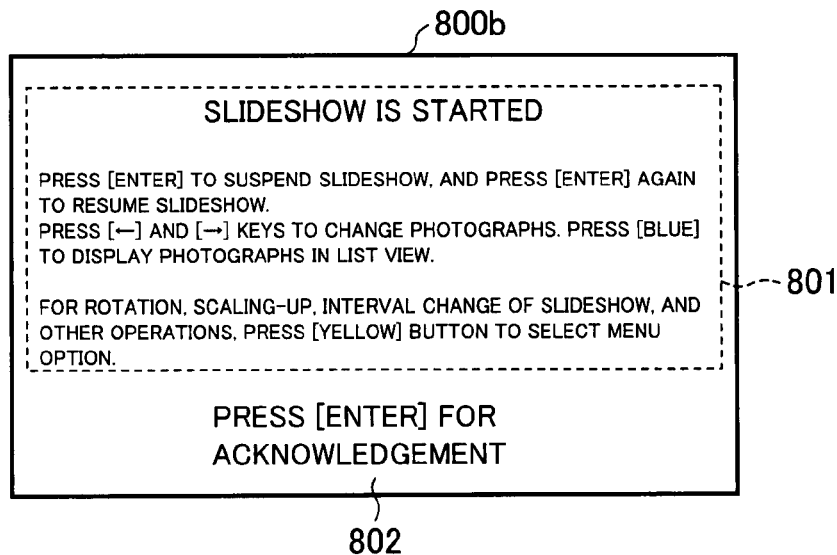
FIG. 12(b) is an explanatory view illustrating an example of the structure of a display screen shown during an operation guidance display (head-image-display-ready) state.

After the transition to the operation guidance display (head-image-display-ready) state S4, the operation information reflecting section 111 instructs the display control section 115 to update the currently shown display screen 800a so as to present to a user that the head image (selected image) is ready to be displayed. In response to the instruction, the display control section 115 updates the display screen 800a illustrated in FIG. 12(a) to a display screen 800b illustrated in FIG. 12(b), for example. The display screen 800b includes not only the operation guidance character string 801, but also an available command display area 802 that urges a user who has finished checking the operation guidance to press the enter button 163e. The above-mentioned process for presenting to the user that the head slide (selected slide) is ready to be displayed is a process for providing a better operating comfort for the user, and thus can be omitted.

In a case where there is no response from the server device 200 within a predetermined time period after the transmission of the head slide (selected slide) acquisition request, the data managing section 112 transmits to the operation information reflecting section 111 a data acquisition failure notification that is a notification of the occurrence of the event E3b. The data managing section 112 also transmits the data acquisition failure notification that is a notification of the occurrence of the event E3b to the operation information reflecting section 111 in a case where there is something wrong with data acquired as a response to the head slide (selected slide) acquisition request. Upon receipt of any of the data acquisition failure notifications, the operation information reflecting section 111 causes transition to the error state S9. The error state S9 will be described later.

Operation Guidance Display (Head-Image-Display-Ready) State S4

The operation guidance display (head-image-display-ready) state S4 is a state waiting for user's press of the enter button 163e after the acquisition of slide data of a head slide (selected slide) is completed. In the operation guidance display (non-head-image-display-ready) state S3, the above-mentioned display screen 800b is displayed on the display section 140.

In the operation guidance display (head-image-display-ready) state S4, the operation information reflecting section 111 waits for operation information notification that is a notification of the occurrence of an event E4a. The event E4a is an event that the enter button 163e has been pressed.

Upon detection of the press of the enter button 163e of the remote controller 160 (instruction to start display of the head slide (selected slide) from the user), the operation information generating section 117 transmits to the operation information reflecting section 111 the operation information notification that is a notification of the occurrence of the event E4a. Upon receipt of the operation information notification, the operation information reflecting section 111 causes transition to the image display (non-next-image-display-ready) state S5.

After the transition to the image display (non-next-image-display-ready) state S5, the operation information reflecting section 111 instructs the display control section 115 to display the head slide (selected slide) on the display section 140. The display control section 115 shows on the display section 140 a display screen for displaying the head slide (selected slide) that has been already drawn off-screen. Then, the operation information reflecting section 111 instructs the data managing section 112 to acquire slide data of a slide to be displayed next (next slide). The data managing section 112 transmits to the server device 200 a next slide acquisition request for acquiring slide data of the next image. The operation information reflecting section activates the timer section 116.

Note that in the present embodiment, with a press of a predetermined button of the remote controller 160 during a time period in which an image is displayed on the display section 140, the user can edit the displayed image (e.g. rotation, zoom-in, zoom-out, and color correction). Upon receipt of editing instruction entered by the user, the operation information reflecting section 111 performs a process corresponding to the entered instruction and causes the operation information storage section 132 of the storage section 130 to store therein operation information indicative of the content of the entered instruction. The processes regarding image editing will be described later.

Image Display (Non-Next-Image-Display-Ready) State S5

The image display (non-next-image-display-ready) state S5 is a state waiting for a response of the server device 200 to the previously transmitted next slide acquisition request.

Figure 13A:
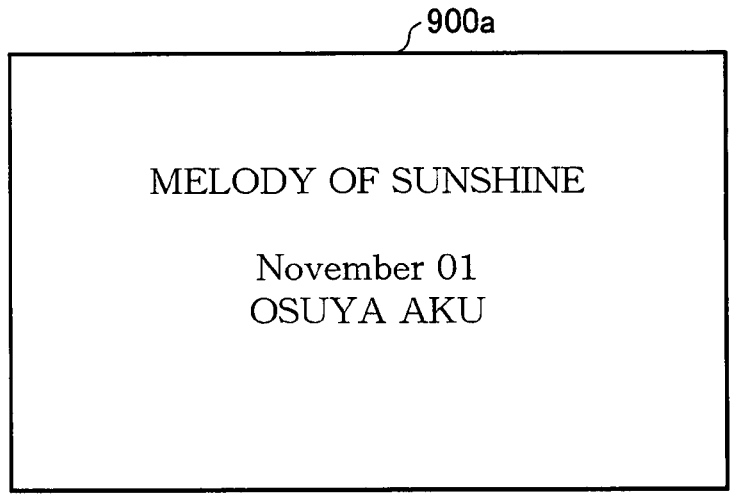
FIG. 13(a) is an explanatory view illustrating an example of the structure of a display screen shown during an image display (non-next-image-display-ready) state, the display screen including a head image, in the image display device according to the embodiment of the present invention.
Figure 13B:
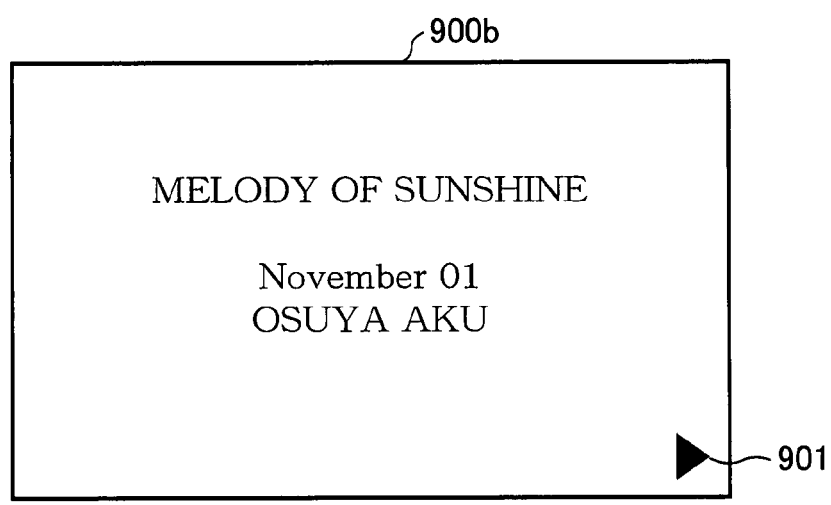
FIG. 13(b) is an explanatory view illustrating an example of the structure of a display screen shown during an image display (non-next-image-display-ready) state, the display screen including a head image and an icon for instructing change to a next image, in the image display device according to the embodiment of the present invention.
Figure 13C:
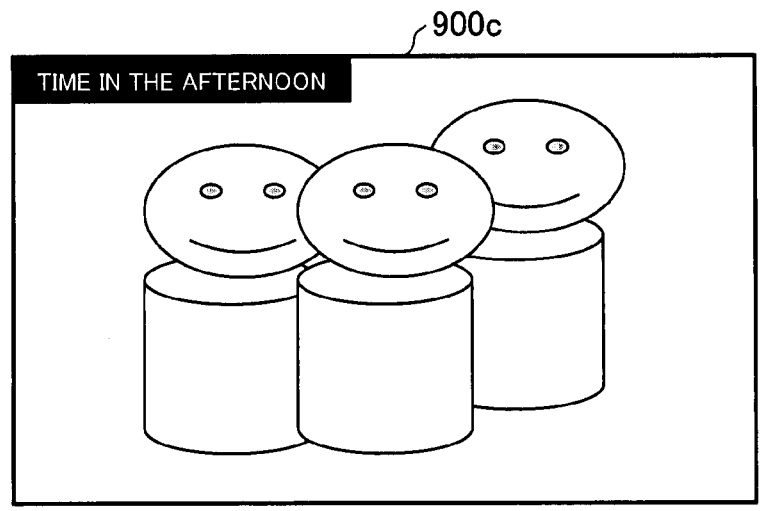
FIG. 13(c) is an explanatory view illustrating an example of the structure of a display screen shown during an image display (next-image-acquisition completed) state, the display screen including other image, in the image display device according to the embodiment of the present invention.

In the image display (non-next-image-display-ready) state S5, the slide that has been already acquired is displayed on the display section 140. That is, in the case of transition from the operation guidance display (head-image-display-ready) state S4 to the state S5, the head slide (selected slide) is displayed on the display section 140. A display screen 900a illustrated in FIG. 13(a) is an exemplary display screen on which a head slide of an album is displayed. In the case of transition from the image display (next-image-display-ready) state S6 to the state S5, which will be described later, a previous slide, i.e. a slide which has been acquired in the image display (next-image-display-ready) state S6 is displayed on the display section 140. A display screen 900c illustrated in FIG. 13(c) is an exemplary display screen on which other image included in the album (e.g. fourth image in the album) is displayed as the previous image.

In the image display (non-next-image-display-ready) state S5, the operation information reflecting section 111 waits for a notification of success of acquisition of slide data of a next slide from the data managing section 112.

Upon completion of the acquisition of slide data of a next slide transmitted from the server device 200 as a response to the next slide acquisition request, the data managing section 112 transmits to the operation information reflecting section 111 data acquisition success notification that is a notification of the success of acquisition of the slide data of the next slide. Upon receipt of the data acquisition success notification, the operation information reflecting section 111 instructs the display screen creating section 113 to create a display screen for displaying an image based on the acquired slide data of the next slide on the display section 140. In response to the instruction, the display screen creating section 113 creates the display screen for displaying the image based on the acquired slide data of the next slide on the display section 140, and then draws the created display screen off-screen. In a case where not only image data of the next slide that is the target image but also an image display screen creation script for displaying the next slide have been acquired, the display screen creating section 113 creates a display screen in accordance with layout information of the image display screen creation script and the image data of the target image, and draws the created display screen off-screen. At this moment, the display screen creating section 113 creates an edited version of a display screen on the basis of the user's operation information regarding the next slide, which information is stored in the operation information storage section 132. In a case where the acquired slide data of the next slide is compressed data, the display screen creating section 113 instructs the decompression processing section 114a of the image data expanding section 114 to expand the compressed image data. Further, in a case where the acquired slide data of the next slide is encoded data, the display screen creating section 113 instructs the decoding section 114b of the image data expanding section 114 to expand the encoded data. In response to these instructions, the image data expanding section 114 immediately expands the acquired slide data of the next slide into a displayable form. When the display screen creating section 113 has finished drawing the display screen off-screen, the operation information reflecting section 111 causes transition to the image display (next-image-display-ready) state S6.

After the transition to the image display (next-image-display-ready) state S6, the operation information reflecting section 111 instructs the display control section 115 to update the currently shown display screen 900a or 900c. In response to the instruction, the display control section 115 updates the display screen 900a illustrated in FIG. 13(a) to a display screen 900b illustrated in FIG. 13(b), for example, so as to present to the user that the next slide is ready to be displayed. Especially, the display screen 900b includes a right arrow icon 901 as information indicating that the next slide can be displayed with the press of the right button. The above-mentioned process for presenting to the user that the next slide is ready to be displayed is a process for providing a better operating comfort for the user, and thus can be omitted.

When the next slide is ready to be displayed, i.e. when (a) the acquisition of the slide data of the next slide and (b) the expansion of the slide data of the next slide have been completed, the operation information reflecting section 111 immediately causes transition to the image display (next-image-display-ready) state S6. In other words, the non-next-image-display-ready) state S5 is a state in which the next slide is not ready to be displayed, i.e. a state in which the data managing section 112 has not yet completed acquiring the slide data of the next slide, or a state in which the image data expanding section 114 has not yet completed expanding the slide data of the next slide.

In the image display (non-next-image-display-ready) state S5, the operation information reflecting section 111 waits for the event E5b that the right button 163d has been pressed, an event E5c that the data managing section 112 has failed in acquiring the slide data of the next slide, or an event E5d that a predetermined time period has elapsed since the timer section 116 was activated. The occurrence of the event E5b means that the user has instructed to display the next slide in the image display (non-next-image-display-ready) state S5. The occurrence of the event E5c means that a given time period set by the timer section 116 has elapsed since the display of the currently displayed image was started, and the time has come to display the next slide with the image display (non-next-image display-ready) state S5 still remained.

Upon detection of the press of the right button 163d that instructs to display the next slide, the operation information generating section 117 transmits to the operation information reflecting section 111 operation information notification that is a notification of the occurrence of the event E5b. Upon receipt of the operation information notification, the operation information reflecting section 111 deactivates the timer section 116. When the timer section 116 is deactivated, the operation information reflecting section 111 causes transition to the thumbnail list display state S8.

Note that the operation information generating section 117 may transmit to the operation information reflecting section 111 operation information notification that is a notification of the occurrence of the event E5b, when the operation information generating section 117 detects that the right button 163d has been pressed once. Alternatively, the operation information generating section 117 may transmit to the operation information reflecting section 111 operation information notification that is a notification of the occurrence of the event E5b, when the operation information generating section 117 detects that the right button 163d has been pressed a predetermined number of times (e.g. three times) within a predetermined time period (e.g. one second). Further alternatively, the operation information generating section 117 may transmit to the operation information reflecting section 111 operation information notification that is a notification of the occurrence of the event E5b, only after the display control section 115 has caused the display section 140 to display a currently shown image thereon for a predetermined time period.

In a case where there is no response from the server device 200 within a predetermined time period after the transmission of the next slide acquisition request, the data managing section 112 transmits to the operation information reflecting section 111 data acquisition failure notification that is a notification of the occurrence of the event E5c. Upon receipt of the data acquisition failure notification, the operation information reflecting section 111 recognizes that there is no next slide to be displayed next, and causes transition to the next image absence state S7.

After a predetermined time period has elapsed since the timer section 116 was activated, the timer section 116 transmits to the operation information reflecting section 111 a timer notification that is a notification of the occurrence of the event E5d. Upon receipt of the timer notification in the image display (non-next-image-display-ready) state S5, the operation information reflecting section 111 activates the timer section 116 again. In this case, the operation information reflecting section 111 waits for the event E5a through E5d again, without causing transition to another state.

Image Display (Next-Image-Display-Ready) State S6

The next-image-display-ready state S6 is a state in which the next slide to be displayed next is ready to be displayed and a state waiting for the timing at which the next slide is to be displayed. Even when the operation information reflecting section 111 causes transition from the image display (non-next-image-display-ready) state S5 to the image display (next-image-display-ready) state S6, the display screens 900a through 900c are kept displayed without being updated.

In the image display (next-image-display-ready) state S6, the operation information reflecting section 111 waits for an event E6a that a predetermined time period has elapsed since the activation of the timer section 116, or an event E6b that the right button 163d has been pressed. Here, the occurrence of the event E6a means that a predetermined time period set by the timer section 116 has elapsed since display of the currently displayed image was started, and the time has come to display the next slide. The occurrence of the event E6b means that the user has instructed to display the next image.

After a predetermined time period has elapsed since the timer section 116 was activated, the timer section 116 transmits to the operation information reflecting section 111 a timer notification that is a notification of the occurrence of the event E6a. Upon detection of the press of the right button 163d that instructs to display the next slide, the operation information generating section 117 transmits to the operation information reflecting section 111 operation information notification that is a notification of the occurrence of the event E6b. Upon receipt of either the timer notification or the operation information notification, the operation information reflecting section 111 causes transition to the image display (non-next-image-display-ready) state S5.

After the transition to the image display (non-next-image-display-ready) state S5, the operation information reflecting section 111 instructs the display control section 115 to display the next slide on the display section 140. The display control section 115 causes the display section 140 to display thereon a display screen for displaying the next slide which has been already drawn off-screen. Then, the operation information reflecting section 111 instructs the data managing section 112 to acquire slide data of a new next slide to be displayed subsequent to the image currently displayed on the display section 140 (i.e. image hereinbefore referred to as next slide). The data managing section 112 transmits to the server device 200 a next slide acquisition request for acquiring the slide data of the new next slide. Further, the operation information reflecting section activates the timer section 116 again.

Next Image Absence State S7

The next image absence state S7 is a state in which the data managing section 112 has failed in acquiring the slide data of the next slide to be displayed next from the server device 200. For example, the following case applies, that is, a case when an attempt was made to acquire a 37th image although the album displayed in slideshow display is an album that consists of 36 images.

In the next image absence state S7, the operation information reflecting section 111 waits for an event E7a that a predetermined time period has elapsed since the activation of the timer section 116 or an event E7b that the right button 163d has been pressed. The occurrence of the event E7a or E7b in the next image absence state S7 means that although it is impossible to acquire the slide data of the next slide to be displayed, the time has come to display the next slide or the user has instructed to display the next image.

In a case where these events have occurred in the next image absence state S7, the operation information reflecting section 111 also causes transition to the thumbnail list display state S8.

Thumbnail List Display State S8

The thumbnail list display state S8 is a state in which thumbnails of images included in an album are displayed in list view. That is, in the thumbnail list display state S8, the display control section 115 causes the display section 140 to display a thumbnail list view screen thereon.

Figure 14:
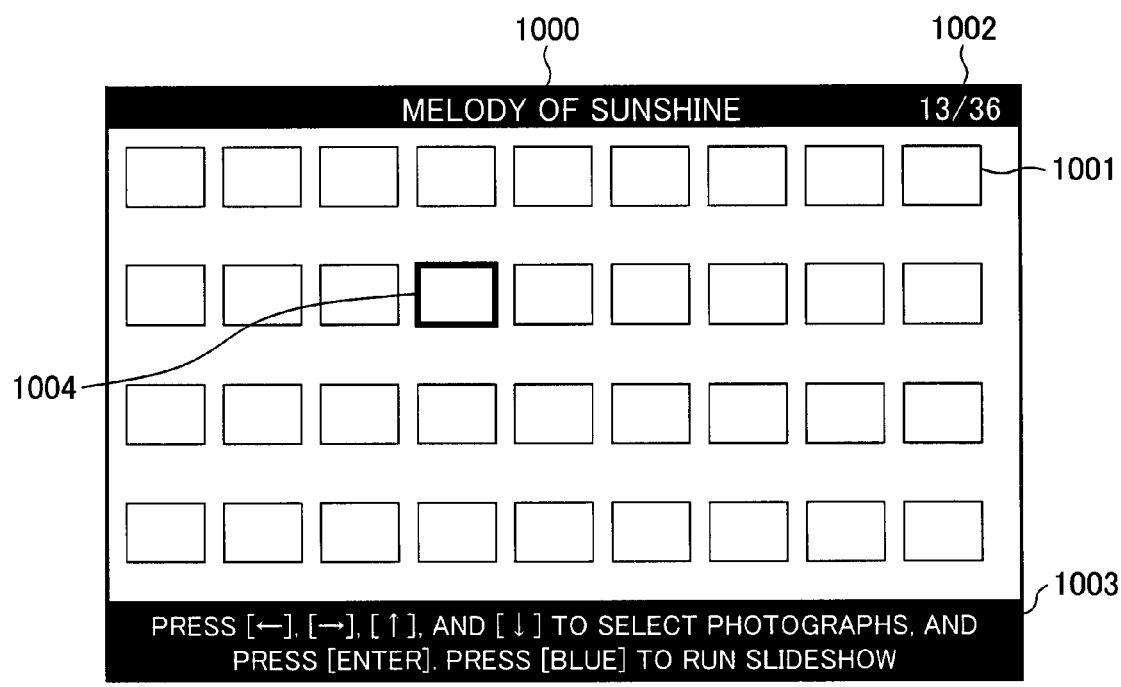
FIG. 14 is an explanatory view illustrating an example of the structure of a display screen shown during a thumbnail list display state in the image display device according to the embodiment of the present invention.

FIG. 14 is a display screen block diagram illustrating an exemplary structure of a thumbnail list view screen 1000 which the display control section 115 causes the display section 140 to display in the thumbnail list display state S8. As illustrated in FIG. 14, the thumbnail list view screen 1000 includes a plurality of thumbnails 1001, a title display area 1002 where a title of an album is displayed, and an available command display area 1003 where commands that the user can enter are displayed in list view. The thumbnail 1001 is a reduced image of an image included in an album. In FIG. 14, 36 thumbnails 1001 of 36 images included in the album are arranged and displayed in list view on the thumbnail list view screen 1000. Note that the thumbnails 1001 displayed on the thumbnail list view screen 1000 may be all thumbnails of a plurality of images included in an album or may be a part of the thumbnails.

In a state where the thumbnail list view screen 1000 as illustrated in FIG. 14 is displayed, the operation information reflecting section 111 waits for notification of an event. The events to which the operation information reflecting section 111 responds in the thumbnail list display state S8 is an event E8a that the upward, downward, left, or right button of the cross button section 163 has been pressed and an event E8b that the enter button 163e has been pressed.

Upon detecting a press of any of the upward, downward, left, and right buttons of the remote controller 160, the operation information generating section 117 transmits to the operation information reflecting section 111 an operation information notification that is a notification of the occurrence of the event E8a. The operation information notification includes information indicative of which button of the upward, downward, left, and right buttons has been pressed. Upon receipt of the operation information notification, the operation information reflecting section 111 updates thumbnail selection state information in accordance with which button has been pressed. The thumbnail selection state information indicates which thumbnail has been selected from among the thumbnails displayed in list view. Further, the operation information reflecting section 111 instructs the display control section 115 to update a display screen. In response to the instruction, the display control section 115 highlights a thumbnail currently selected in the thumbnail list view screen 1000, in accordance with the thumbnail selection state information.

When the operation information generating section 117 detects that the enter button 163e of the remote controller 160 has been pressed, the operation information generating section 117 transmits to the operation information reflecting section 111 an operation information notification that is a notification of the occurrence of the event E8b. Upon receipt of the operation information notification, the operation information reflecting section 111 causes transition to the foregoing operation guidance display (non-head-image-display-ready) state S3. Further, the operation information reflecting section 111 determines a selected image that is selected at a point in time when the event E8b occurs, in accordance with the thumbnail selection state information, and instructs the data managing section 112 to acquire the selected image. The data managing section 112 transmits to the server device 200 a selected image acquisition request for acquiring the selected image.

Error State S9

The error state S9 is a state to which transition is caused when abnormality has occurred in the above processes. In the error state S9, the display control section 115 causes error display screens 1100a through 1100c as illustrated in FIG. 15.

Figure 15A:
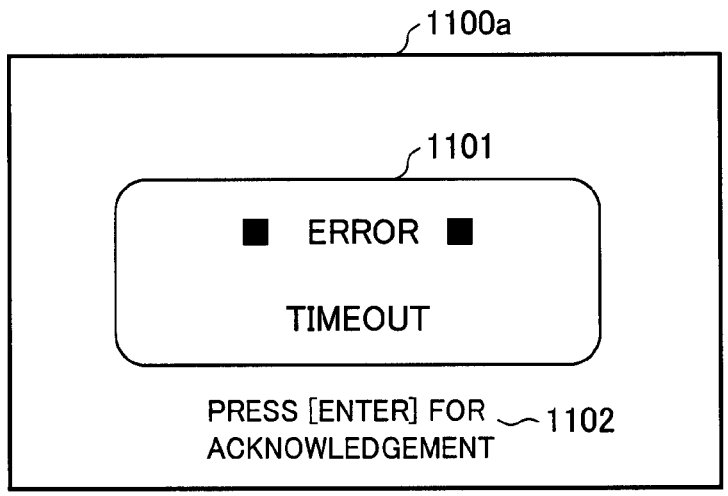
FIGS. 15(a) through 15(c) are explanatory views illustrating examples of the structure of a display screen shown during an error state in the image display device according to the embodiment of the present invention.
Figure 15B:
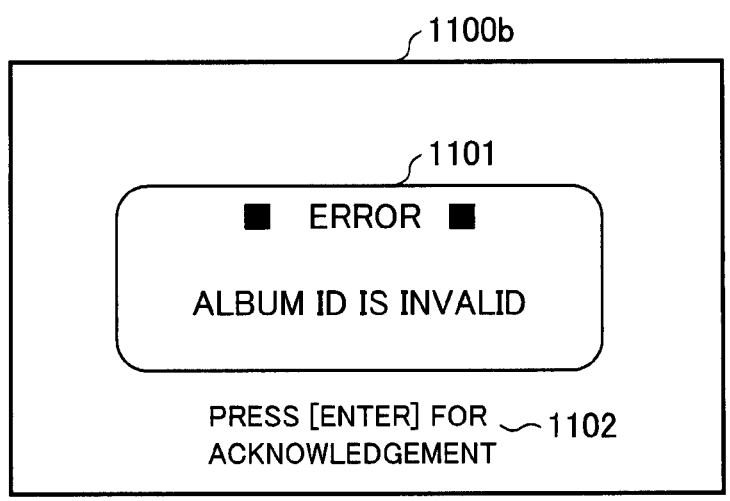
Figure 15C:
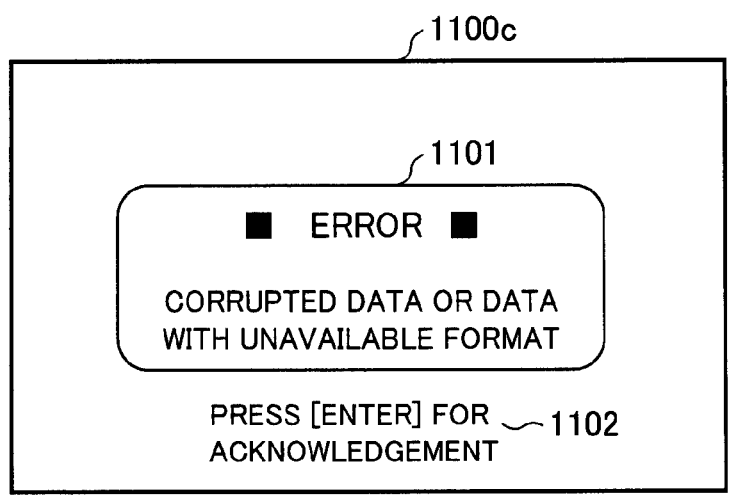

FIGS. 15(a) through 15(c) are display screen block diagram illustrating an exemplary structure of an error display screen which the display control section 115 causes the display section 140 to display when error occurs. The error display screen 1100a illustrated in FIG. 15(a) is an exemplary error display screen which is displayed when there has been no response of the server device 200 to the album information acquisition request within a predetermined time period. An error display screen 1100b illustrated in FIG. 15(b) is an exemplary error display screen which is displayed when an album having an album ID designated by the user is not managed under the server device 200. An error display screen 1100c illustrated in FIG. 15(c) is an exemplary error display screen which is displayed when there is something wrong with image data acquired as a response to the foregoing head image acquisition request.

As illustrated in FIGS. 15(a) through 15(c), each of the error display screens 1100a through 1100c includes an error information display area 1101 and an available command display area 1102. The error information display area 1101 includes a character string representing the type of error caused. The available command display area 1102 is an area where commands that the user can enter are displayed in list view. In the available command display area 1102, it is shown that the user can inform that the user has acknowledged error information with a press of the enter button 163e.

In a state where the error display screens 1100a through 1100c as illustrated in FIGS. 15(a) through 15(c) are displayed, the operation information reflecting section 111 waits for the occurrence of an event E9a that the enter button 163e has been pressed.

When the operation information generating section 117 detects that the enter button 163e of the remote controller 160 has been pressed, the operation information generating section 117 transmits to the operation information reflecting section 111 an operation information notification that is a notification of the occurrence of the event E9a. Upon receipt of the operation information notification, the operation information reflecting section 111 causes transition to the album ID designation state S1, which is an initial state.

A state transition table is shown below. The state transition table is referred to by the operation information reflecting section 111 in order to perform the above processes. In the state transition table below, each row shows any of the foregoing nine states, and each column shows an event to which the operation information reflecting section 111 responds. Each cell is divided into three rows, in which a first row shows a pre-transition process, a second row shows a transition destination, and a third row shows a post-transition process. A blank field in the table indicates that a process to be performed or a transition process is not defined.

tion 120. In the latter case, the communication section 120 of the slideshow display device 100 may be arranged to acquire the state transition table at once before or at the time of starting a slideshow display, or may be arranged to separately acquire sets of state transition definition information in the rows of the state transition table. The state transition definition information can be described in MTD (Message Template Definition). The state transition definition information described in MTD is transmitted from the server device 200 to the slideshow display device 100 in such a manner that the

TABLE 1

| | Press of numeric button | Press of enter button | Press of upward, downward, left, or right button | Success of data acquisition | Failure of data acquisition | Timer |
|---|---|---|---|---|---|---|
| S1: Album ID designation state | Update album ID | | Update album selection state information | | | |
| | | Transition to S2 Album information acquisition request | | | | |
| S2: Album information acquisition state | | | | Transition to S3 Head image acquisition request | Transition to S9 | |
| S3: Operation guidance display (non-head-image-display-ready) state | | | | Create head image display screen Transition to S4 Update display screen | Transition to S9 | |
| S4: Operation guidance display (head-image-display-ready) state | | Transition to S5 Image display Next image acquisition request Activate time section | | | | |
| S5: Image display (non-next-image-display-ready) state | | | Deactivate timer section Transition to S8 | Create next image display screen Transition to S6 Update display screen | Transition to S7 | Reactivate timer section |
| S6: image display (next-image-display-ready) state | | | Transition to S5 Image display Next image acquisition request Activate time section Transition to S2 | | | Transition to S5 Image display Next image acquisition request Activate time section Transition to S2 |
| S7: Image display (next image absence) state | | | | | | |
| S8: Thumbnail list display state | | | Update thumbnail selection state information | | | |
| | | Transition to S3 Selected image acquisition request | | | | |
| S9: Error state | | Transition to S1 | | | | |

Note that the state transition table may be stored in advance in the slideshow display device 100, for example, in the storage section 130. Alternatively, the state transition table may be the one that the slideshow display device 100 acquires from the server device 200 through the communication secstate transition definition information is embedded into a thumbnail list view screen creation script or an image display screen creation script, which is XML data, or the state transition definition information is treated as a script that is independent from these display screen creation scripts.

(Details of Processes Performed by the Control Section 110 at the Slide Display)

Figure 16:
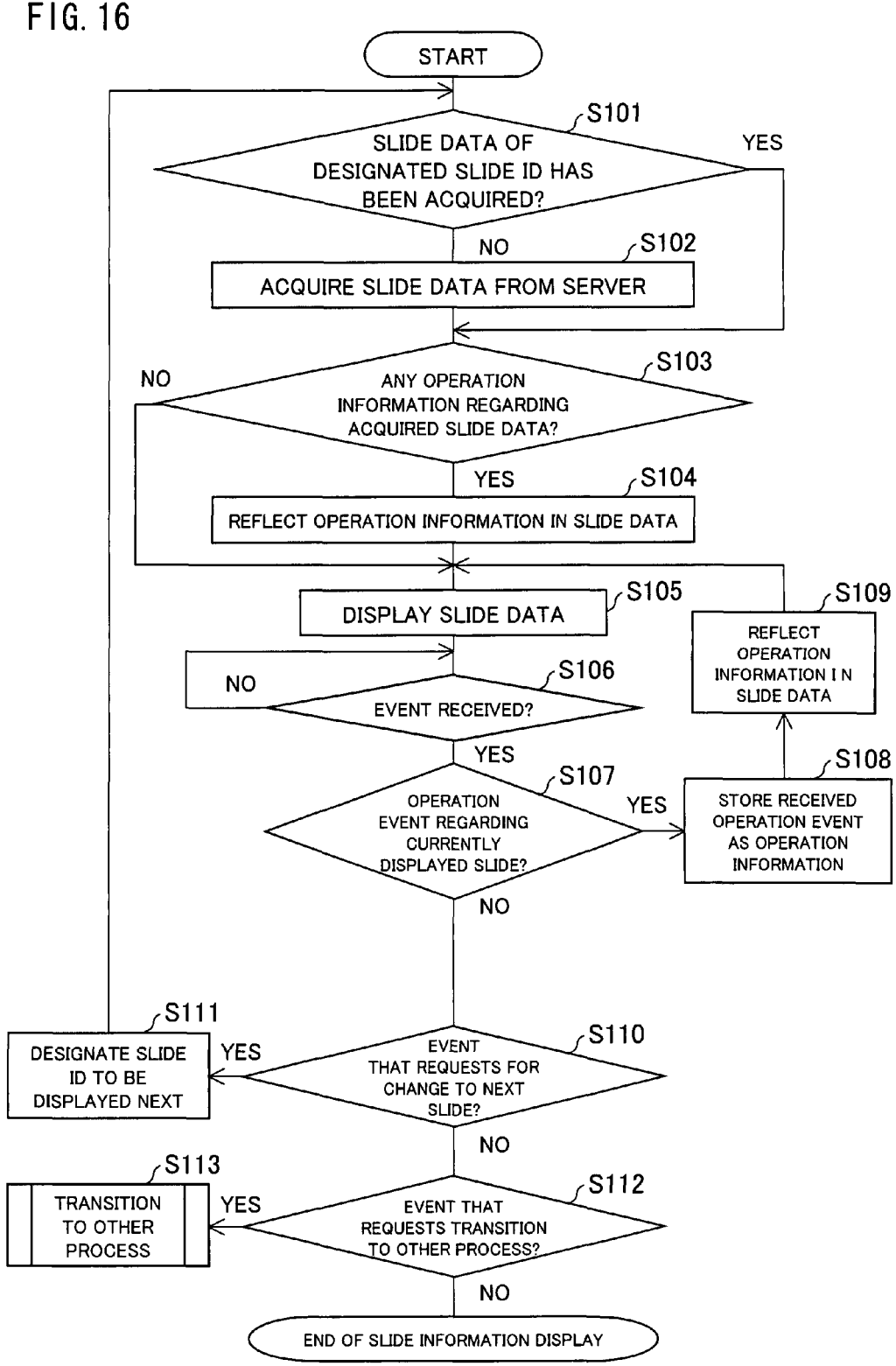
FIG. 16 is a flowchart showing an example of a slide displaying process in the image display device of the embodiment of the present invention.

FIG. 16 is a flowchart showing a flow of processes performed by the control section 110 at the display of slides.

The operation information reflecting section 111 determines whether slide data of a slide for which the display screen creating section 113 creates a display screen has been acquired from the server device 200 (S101). The operation information reflecting section 111 can realize this process, for example, by causing the data managing section 112 to check whether the target slide data has been stored in the storage section 130, or by determining whether data acquisition success notification for the target slide data has been already received.

If the operation information reflecting section 111 determines that the target slide data has not been acquired, the operation information reflecting section 111 causes the data managing section 112 to transmit to the server device 200 a data acquisition request for acquiring the target slide data, so that the data managing section 112 acquires the slide data from the server device 200 (S102).

After the slide data is acquired in S102 or if the operation information reflecting section 111 determines in S101 that the slide data has been acquired, the operation information reflecting section 111 determines whether operation information of the past regarding this slide has been stored in the operation information storage section 132 (S103). The operation information reflecting section 111 can realize this process, for example, by causing the data managing section 112 to check whether operation information for the target slide has been stored in the storage section 130.

If the operation information of the past has been stored in the operation information storage section 132, the operation information reflecting section 111 causes the display screen creating section 113 to reflect in the slide data edits (e.g. rotation, zoom-in, and zoom-out) indicated in the operation information of the past (S104). For example, suppose that the target image was rotated by 90 degrees at the last display. In this case, this edit is reflected in the slide data by rotating the target image of server data acquired from the server device 200, so that the target image can be displayed in the same manner as the target image that was subjected to rotation at the last time.

If the operation information reflecting section 111 determines in S103 that the operation information of the past has not been stored, the operation information reflecting section 111 causes the display screen creating section 113 to create a display screen using the slide data acquired from the server device 200. On the other hand, if the operation information reflecting section 111 determines in S103 that the operation information of the past has been stored, the operation information reflecting section 111 causes the display screen creating section 113 to create a display screen using the slide data created in S104. Then, the operation information reflecting section 111 causes the display control section 115 to display the created display screen on the display section 140 (S105).

The operation information reflecting section 111 monitors event notification from the operation information generating section 117 or the timer section 116 during a period of time in which the slide is displayed on the display section 140 (S106).

Then, upon receipt of the event notification, the operation information reflecting section 111 determines whether the received event notification is an operation event regarding the currently displayed slide (S107).

In S107, if the operation information reflecting section 111 determines that the received event notification is an operation event (an edit made by the user) regarding the currently displayed slide, the operation information reflecting section 111 causes the operation information storage section 132 to store therein the operation regarding the currently displayed slide as the operation information through the data managing section 112 (S108). The operation information reflecting section 111 causes the edit made by the user to be reflected in the slide data (S109), and causes the processes that follows S105 to be performed using the slide data in which details of the editing operation is reflected. The operation information reflecting section 111 stops the timer section 116 for reactivation.

On the other hand, if the operation information reflecting section 111 determines that the received event notification is not an operation event regarding the slide displayed in S106, the operation information reflecting section 111 determines whether the received event notification is an event that requests for change to a next slide (S110). The event that requests for change to a next slide occurs, for example, when a given time period has elapsed without user's operation entry after a timer of the timer section 116 was activated, or when the user instructs change to the next slide by means of the remote controller 160.

If the operation information reflecting section 111 determines in S110 that the event for change to a next slide has occurred, the operation information reflecting section 111 designates an slide ID of a slide to be displayed next to perform the processes that follow S101 (S111).

On the other hand, if the operation information reflecting section 111 determines in S110 that the received event is not the event for change to a next slide, the operation information reflecting section 111 determines whether the received event is an event that requests for transition to other process (S112). If the operation information reflecting section 111 determines that the received event is an event that requests for transition to other process, the operation information reflecting section 111 causes transition to the corresponding process (S113). If the operation information reflecting section 111 determines that the received event is not an event that requests for transition to other process, the operation information reflecting section 111 ends the slide display process.

As described above, when an edit is performed by the user on a currently displayed slide, the slideshow display device 100 according to the present embodiment stores details of this edit in the operation information storage section 132. Then, at the time of displaying the slide downloaded from the server device 200, the slide is displayed in such a manner that the operation information stored in the operation information storage section 132 is reflected in the slide.

This allows the user who views again a slide that he/she previously viewed by downloading the slide from the server device 200 to view the slide in a state where a previous edit is reflected in the slide. Thus, at the time of viewing for the second and subsequent times a slide that the user previously viewed, the user can view the slide in a manner that he/she wants without making an edit, even if there is difference between a display manner based on the slide data transmitted from the server device 200 and a display manner that the user wants.

Further, the server device 200 does not need to make an edit on a slide (image data of a target image, and/or image display screen creation script). This enhances convenience for the user without increasing load on the server device 200.

An edit that was made by the user is not reflected in slide data transmitted from the server device 200. With this arrangement, for example, even if desired display manners are different between a plurality of users (clients) who download one and the same slide data item for display, each of the users can view in a display manner that he/she wants.

Note that all edits that have been made on a slide to be displayed may be stored as the operation information in the operation information storage section 132 of the slideshow display device 100, or a predetermined edit of edits that has been made on a slide to be displayed may be stored as the operation information in the operation information storage section 132 of the slideshow display device 100. The user may select which operation information is to be stored in the operation information storage section 132. The operation information may be stored only when the user instructs to store the operation information.

For example, there is often a case where an image taken by a camera-equipped mobile telephone, a digital camera, a scanner, or the like is displayed so as to be oriented in a manner against user's intention (i.e. displayed in such a manner that its original image is rotated by 90 degrees). In such a case, the user generally rotates the displayed image by 90 degrees to view the image. In view of this, by storing in advance operation information regarding rotation of the image, it is not necessary to perform rotation operation when the same image is viewed for the second and subsequent times.

Further, there is often, for example, a case where the user zooms in on a particular section of an image, like a case where the user zooms in on a particular person that appears in a group photograph. In view of this, information such as a section to be zoomed in and a zoom range is stored in advance as the operation information. With this arrangement, the user can view the image in a manner that he/she wants for the second and subsequent times, without doing zoom-in operation again.

Still further, the operation information to be stored in the operation information storage section 132 may be an edit made on a target image included in a slide, such as: rotation of an image; corrections including gamma correction, color correction, and contrast correction; and change of image correction parameters including skin tone correction, angle correction, and red-eye automatic correction.

Yet further, in a case where the image display screen creation script is used to display a slide, the operation information to be stored in the operation information storage section 132 may be manipulations regarding the matters other than display of image data of a target image (e.g. rotation of a slide, zoom ratio (zoom-in/zoom-out), a display position (sideway scrolling and up and down scrolling), and whether a comment (character string) is to be displayed), which manipulations are created on the basis of the image display screen creation script.

Second Embodiment

The following will describe another embodiment of the present invention. Note that, for the purpose of explanation, functional blocks having the same functions as those described in First Embodiment are given the same reference numerals and explanations thereof are omitted here.

The edit made on a slide by the user, which is stored in the storage section 130 (operation information storage section 132) included in the slideshow display device 100 in First Embodiment, is stored in the server device in the present embodiment. However, as in First Embodiment, the server device does not make an edit on slide data.

Figure 17:
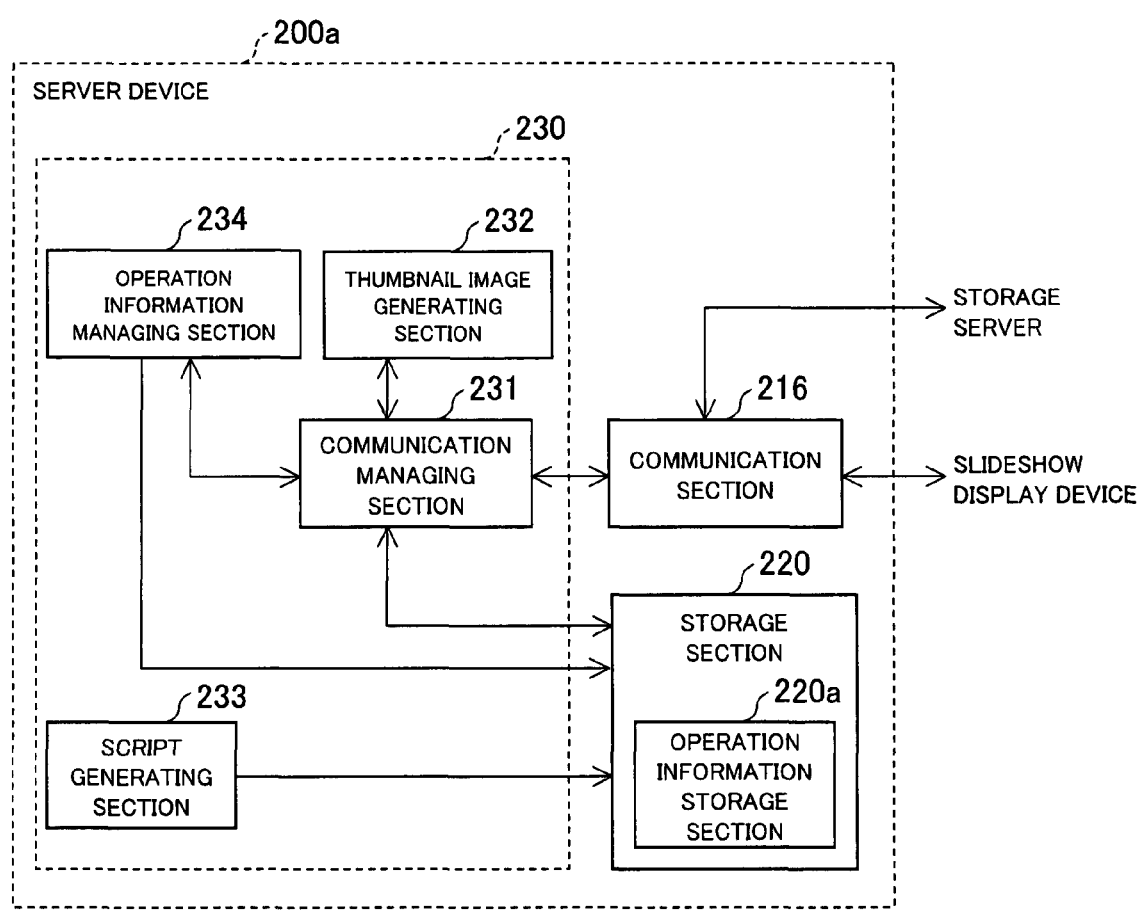
FIG. 17 is a functional block diagram schematically illustrating the structure of a server device which is included in an image display system according to another embodiment of the present invention.

FIG. 17 is a functional block diagram of a server device (image data transmitting device) 200a which is included in a slideshow display system 1 of the present embodiment. As illustrate in FIG. 17, the server device 200a includes not only the server device 200 illustrated in FIG. 7, but also an operation information managing section (standard operation information generating section) 234 and an operation information storage section 220a.

The operation information managing section 234 causes the operation information storage section 220a, which is included in a storage section 220, to store therein operation information indicative of an edit made by the user on each slide uploaded from the slideshow display device 100. In a case where there is a slide data acquisition request from the slideshow display device 100, the operation information managing section 234 detects whether operation information regarding the requested slide data and the slideshow display device 100 (client) which has transmitted the acquisition request is stored in the operation information storage section 220a. If the requested slide data and the operation information are stored in the operation information storage section 220a, they are transmitted to the slideshow display device 100.

Figure 18:
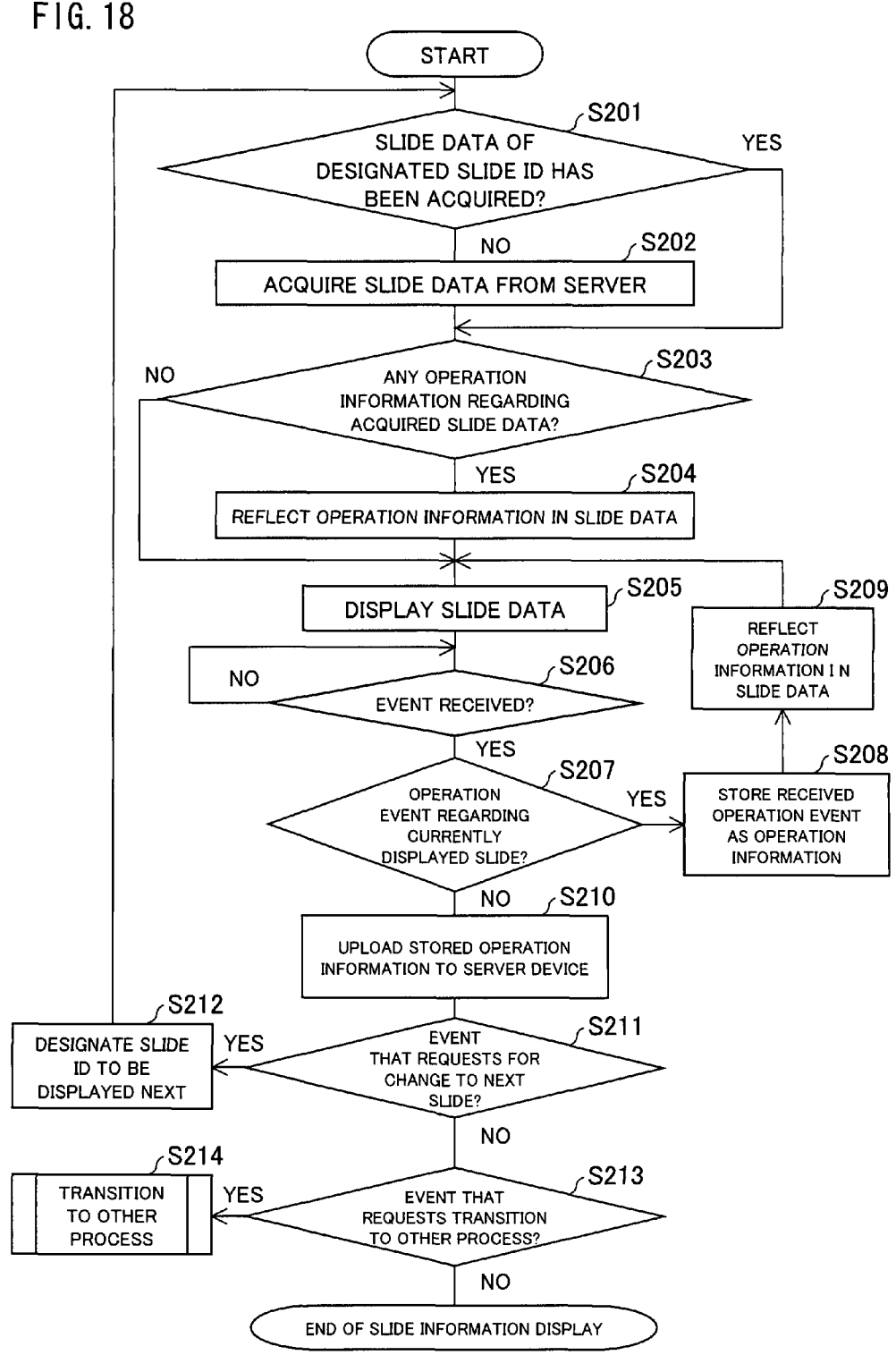
FIG. 18 is a flowchart showing an example of a slide displaying process in the image display device according to the another embodiment of the present invention.

FIG. 18 is a flowchart showing a flow of processes performed by the control section 110 at the slide display.

The operation information reflecting section 111 determines whether slide data of a slide for which the display screen creating section 113 creates a display screen has been acquired from the server device 200a (S201).

If the operation information reflecting section 111 determines that the target slide data has not been acquired, the operation information reflecting section 111 causes the data managing section 112 to transmit to the server device 200a a data acquisition request for acquiring the target slide data, so that the data managing section 112 acquires the slide data from the server device 200a (S202). As will be described later, in a case where operation information of the past regarding this slide data is stored in the server device 200a, the server device 200a transmits to the slideshow display device 100 the operation information and the slide data. Further, when the data managing section 112 acquires the operation information and the slide data, the data managing section 112 causes the operation information storage section 132 to store therein the acquired operation information.

After the slide data is acquired in S202 or if the operation information reflecting section 111 determines in S201 that the slide data has been acquired, the operation information reflecting section 111 determines whether there is operation information of the past regarding this slide (S203). For example, if the operation information reflecting section 111 determines in S201 that the slide data has been acquired, the operation information reflecting section 111 causes the data managing section 112 to check whether the operation information for the target slide has been stored in the operation information storage section 132.

If the operation information reflecting section 111 determines in S203 that there is the operation information of the past regarding the slide, the operation information reflecting section 111 instructs the display screen creating section 113 to reflect this operation information of the past in the slide data (S204).

On the other hand, if the operation information reflecting section 111 determines in S203 that there is not the operation information of the past regarding the slide, the operation information reflecting section 111 causes the display screen creating section 113 to create a display screen using the slide data acquired from the server device 200a. If the operation information reflecting section 111 determines in S203 that the operation information of the past has been stored, the operation information reflecting section 111 causes the display screen creating section 113 to create a display screen using the slide data in which the operation information has been reflected in S204. Then, the operation information reflecting section 111 causes the display control section 115 to display the created display screen on the display section 140 (S205).

The operation information reflecting section 111 monitors event notification from the operation information generating section 117 or the timer section 116 during a period of time in which the slide is displayed on the display section 140 (S206).

Then, upon receipt of the event notification, the operation information reflecting section 111 determines whether the received event notification is an operation event regarding the currently displayed slide (S207).

In S207, if the operation information reflecting section 111 determines that the received event notification is an operation event (an edit made by the user) regarding the currently displayed slide, the operation information reflecting section 111 causes the data managing section 112 to temporarily store the edit made on the currently displayed slide as the operation information in the operation information storage section 132 (S208). The operation information reflecting section 111 causes the display screen creating section 113 to reflect the edit made by the user in the slide data (S209), and causes the processes that follows S205 to be performed using the slide data in which the edit is reflected.

On the other hand, if the operation information reflecting section 111 determines in S206 that the received event notification is not an operation event regarding the currently displayed slide, the operation information reflecting section 111 causes the data managing section 112 to transmit (upload) to the server device 200a the operation information temporarily stored in the operation information storage section 132 in S208 (S210). At this moment, the data managing section 112 transmits not only the operation information but also supplementary information. The supplementary information is an album ID, a slide ID, and information for identifying a client (slideshow display device 100 or user) (e.g. terminal ID or user ID). Note that if the operation information reflecting section 111 determines that the operation information regarding the currently displayed slide has not been stored in the operation information storage section 132, the process in S210 may be skipped to proceed to S211. After the operation information is transmitted to the server device 200a (or after receipt of a reception success notification regarding the operation information transmitted from the server device 200a), the operation information reflecting section 111 may cause the data managing section 112 to delete the operation information stored in the operation information storage section 132. This makes it possible to reduce a required storage capacity of the operation information storage section 132.

Thereafter, the operation information reflecting section 111 determines whether the received event notification is an event that requests for change to a next slide (S211).

If the operation information reflecting section 111 determines in S211 that the event for change to a next slide has occurred, the operation information reflecting section 111 designates an slide ID of a slide to be displayed next to perform the processes that follow S201 (S212).

On the other hand, if the operation information reflecting section 111 determines in S211 that the received event is not the event for change to a next slide, the operation information reflecting section 111 determines whether the received event is an event that requests for transition to other process (S213). If the operation information reflecting section 111 determines that the received event is an event that requests for transition to other process, the operation information reflecting section 111 causes transition to the corresponding process (S214). If the operation information reflecting section 111 determines that the received event is not an event that requests for transition to other process, the operation information reflecting section 111 ends the slide display process.

Figure 19:
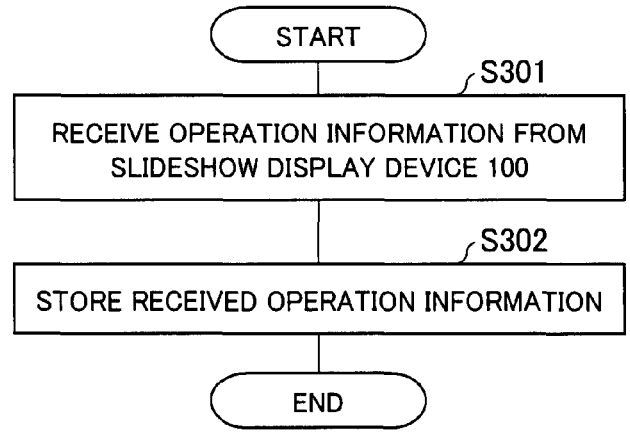
FIG. 19 is a flowchart showing a flow of processes performed when the server device, which is included in the image display system according to the another embodiment of the present invention, has received operation information.

FIG. 19 is a flowchart showing a flow of processes performed when the server device 200a has received the operation information from the slideshow display device 100.

As illustrated in FIG. 19, upon receipt of the operation information from the slideshow display device 100 (S301), the server device 200a stores the received operation information in the operation information storage section 220a (S302). More specifically, upon receipt of the operation information from the slideshow display device 100, the communication managing section 231 transmits to the operation information managing section 234 this operation information and its supplementary information. The operation information managing section 234 stores the operation information and the supplementary information including an album ID, a slide ID, and information for identifying a client in the operation information storage section 220a in such a manner that the operation information and the supplementary information are associated with each other.

Figure 20:
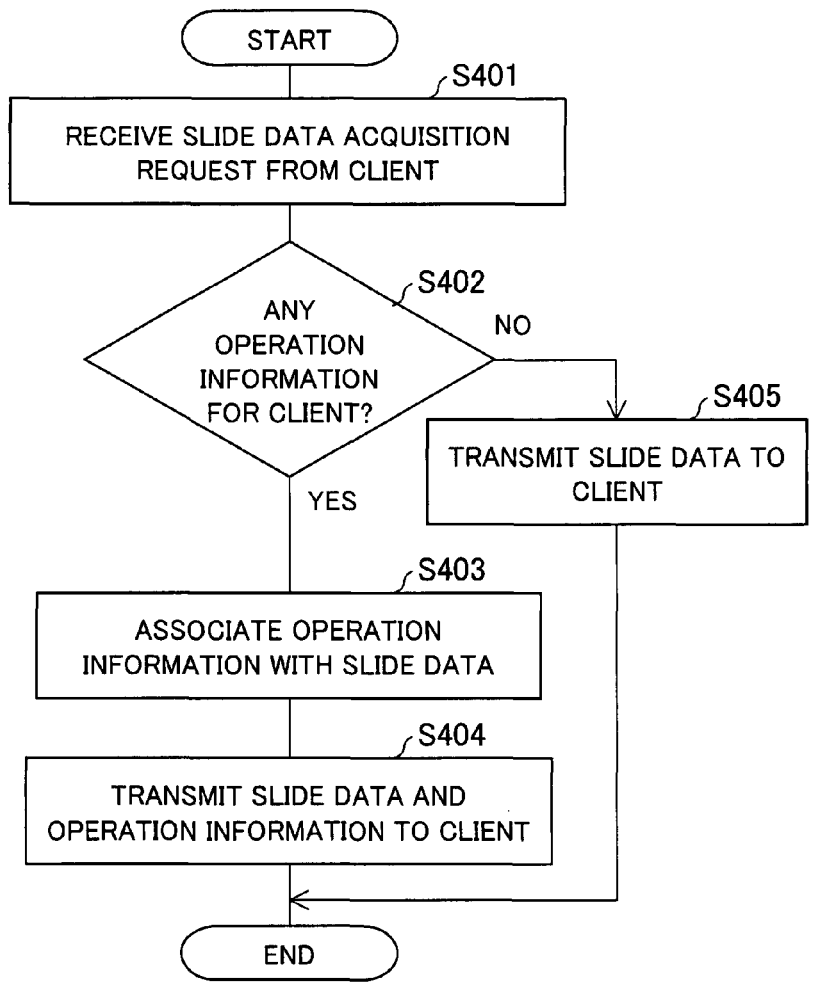
FIG. 20 is a flowchart showing a flow of processes performed when the server device, which is included in the image display system according to the another embodiment of the present invention, has received slide data acquisition request.

FIG. 20 is a flowchart showing a flow of processes performed when the server device 200a has received a slide data acquisition request from the slideshow display device 100.

As illustrated in FIG. 20, upon receipt of a slide data acquisition request from the slideshow display device 100 (S401), the operation information managing section 234 determines whether there is operation information regarding the concerned slide data for a client (slideshow display device 100 or the use thereof) who has transmitted the slide data acquisition request (whether the operation information has been stored in the operation information storage section 220a) (S402).

If the operation information managing section 234 determines that there is the operation information regarding the concerned slide data for the client who has transmitted the slide data acquisition request, the operation information managing section 234 associates the slide data with the abovementioned operation information (S403). Then, the communication managing section 231 transmits to the client the slide data and the operation information associated with the slide data (S404).

On the other hand, in S402, if the operation information managing section 234 determines that there is not the operation information regarding the concerned slide data for the client who has transmitted the slide data acquisition request, the communication managing section 231 transmits the slide data to the client (S405).

As described above, in the present embodiment, operation information regarding an edit made on a slide in each slideshow display device 100 is uploaded to the server device 200a, and the server device 200a stores this operation information.

Thus, the slideshow display device 100 does not necessarily require storing the operation information. This makes it possible to reduce a storage capacity of the storage section 130 (operation information storage section 132). As such, even if there is limit to the amount of storage capacity provided in the slideshow display device 100, it is possible to appropriately store the operation information so that the stored operation information can be used at the display of the corresponding slide for the second and subsequent times. With this arrangement, even if there is limit to the amount of storage capacity in the slideshow display device 100, it is possible to obtain the same effect as the effect brought by First Embodiment.

In the present embodiment, the operation information needs to be stored in the server device 200a, but the server device 200a does not make an edit on slides. This arrangement makes it possible to reduce increased load on the server device 200a, as compared with the arrangement in which the server device 200a makes an edit on slides.

Additionally, in the present embodiment, when an edit has been made on a currently displayed slide, operation information regarding this edit is temporarily stored in the operation information storage section 132 so that the operation information is transmitted to the server device 200a at the change to a next slide or at the transition to other process. This arrangement makes it possible to reduce communication frequencies and the amount of communication data that occur between the slideshow display device 100 and the server device 200a, as compared with the arrangement in which every time an edit is made on a slide, the corresponding operation information is transmitted to the server device 200a. Moreover, it is possible to reduce increased load on the server device 200a.

The timing at which the slideshow display device 100 uploads the operation information to the server device 200a is not limited to the above-mentioned example. The timing can be appropriately adjusted in consideration of respective loads placed on the slideshow display device 100 and the server device 200a. For example, the operation information may be uploaded at the end of album display (at the time when an album is closed), instead of uploading every time display of each slide ends. This arrangement requires respective items of operation information regarding slides to be temporarily stored in the slideshow display device 100, but reduces load on the server device 200a and communication frequencies and the amount of communication data that occur between the slideshow display device 100 and the server device 200a. Alternatively, the operation information may be uploaded every time an edit is made on a currently displayed slide. This arrangement increases communication frequencies and the amount of communication data, but eliminates the need for the operation information storage section 132 of the slideshow display device 100. This makes it possible to simplify device configuration of the slideshow display device 100 or reduce a storage space.

Further, in the present embodiment, the operation information managing section 234 of the server device 200a stores therein (a) operation information uploaded by the slideshow display device 100 and (b) information (e.g. terminal ID and user ID) for identifying a client (slideshow display device 100 or the user thereof) who has uploaded the operation information in such a manner that the operation information and the information for identifying the client are associated with each other. Then, upon receipt of a slide data acquisition request from the slideshow display device 100, the server device 200a transmits to the slideshow display device 100 (i) slide data and (ii) operation information regarding the concerned slide data for the client who has requested slide data acquisition. With this arrangement, for example, even if desired display manners are different between a plurality of users (clients) who download one and the same slide data for display, each of the users can view in a display manner that he/she wants.

Note that as in the case of the operation information stored in the operation information storage section 132 of the slideshow display device 100 in First Embodiment, all edits that have been made on a slide to be displayed may be uploaded as the operation information to the server device 200a, or a predetermined edit of edits that have been made a slide to be displayed may be uploaded as the operation information to the server device 200a. Further, the user may select which operation information is to be uploaded, and only operation information selected by the user may be uploaded.

Third Embodiment

The following will describe still another embodiment of the present invention. Note that, for the purpose of explanation, functional blocks having the same functions as those described in First and Second Embodiments are given the same reference numerals and explanations thereof are omitted here.

In Second Embodiment, the server device 200a stores therein (a) operation information uploaded from the slideshow display device 100, (b) information for identifying a client who has uploaded, and (c) slide data in such a manner that the operation information, the information for identifying a client who has uploaded, and the slide data are associated with each other, and thereafter, upon receipt of a slide data acquisition request from the client, the server device 200a transmits the slide data and the operation information. On the contrary, in the present embodiment, the server device 200a has not only the function described in Second Embodiment but also the function of generating standard operation information on the basis of plural items of operation information regarding one and the same slide data for a plurality of clients if the items of operation information are uploaded. Note that the structures of the slideshow display device 100 and the server device 200a are identical with those described in Second Embodiment (see FIGS. 1 and 17).

Figure 21:
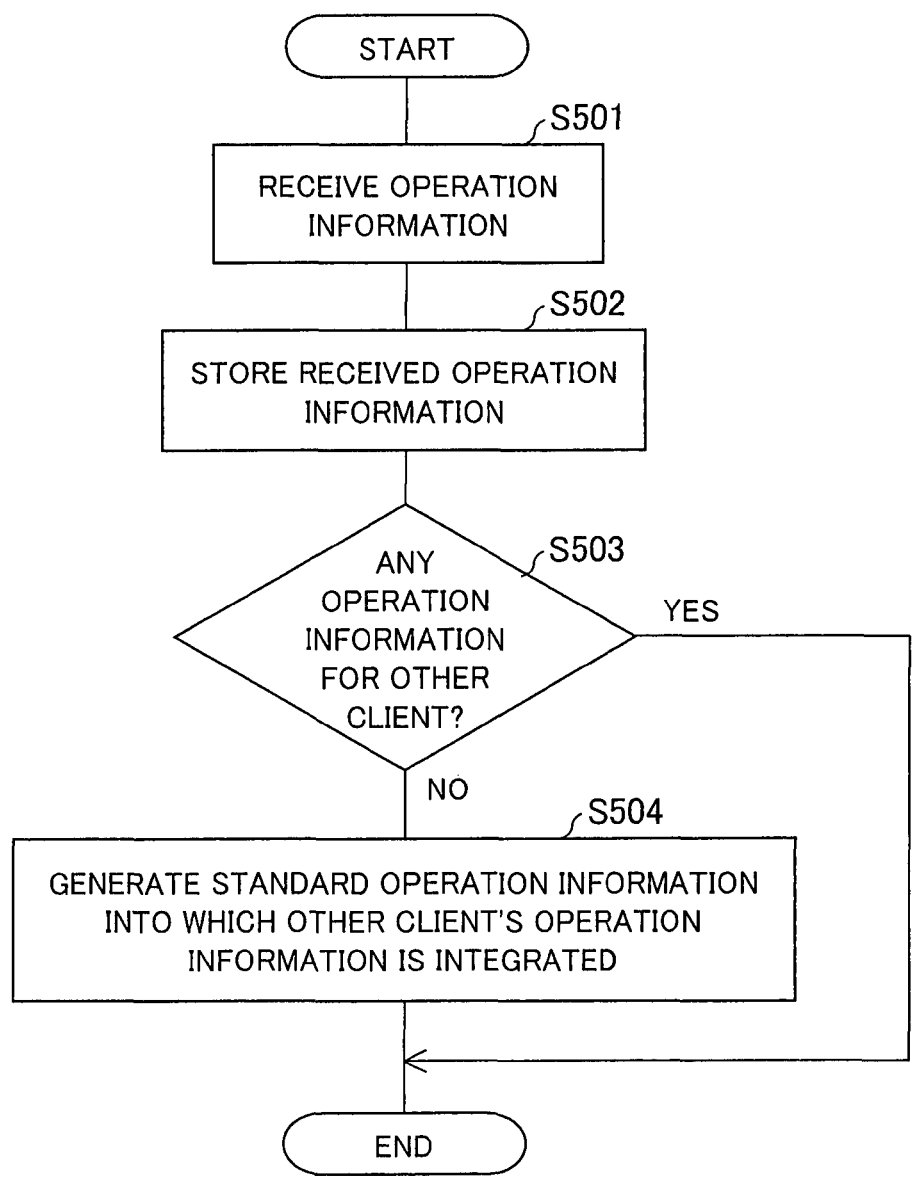
FIG. 21 is a flowchart showing a flow of processes performed when a server device, which is included in an image display system according to still another embodiment of the present invention, has received operation information.

FIG. 21 is a flowchart showing a flow of processes performed when the server device 200a has received operation information from the slideshow display device 100.

As illustrated in FIG. 21, upon receipt of operation information from the slideshow display device 100 (S501), the server device 200a stores the received operation information in the operation information storage section 220a (S502). More specifically, upon receipt of operation information from the slideshow display device 100, the communication managing section 231 transmits to the operation information managing section 234 the operation information and its supplementary information (including album ID, slide ID, and information for identifying a client). The operation information managing section 234 stores in the operation information storage section 220a the operation information, album ID, slide ID, and information for identifying a client in such a manner that the operation information, the album ID, the slide ID, and the information for identifying a client are associated with each other.

Further, the operation information managing section 234 determines whether other client's operation information regarding slide data corresponding to the operation information received in S501 has been stored in the operation information storage section 220a (S503). If other client's operation information has not been stored in the operation information storage section 220a, the operation information managing section 234 ends the process.

On the other hand, if other client's operation information has been stored in the operation information storage section 220a, the operation information managing section 234 integrates the operation information received in S501 and the other client's operation information to generate standard operation information (S504). Thereafter, the operation information managing section 234 stores the generated standard operation in the operation information storage section 220a to end the process.

Although a method for generating the standard operation information (integration method) is not particularly limited, it is preferable to generate the standard operation information so that a manipulation that is expected to be performed by many clients is reflected in the standard operation information.

For example, suppose that clients at a predetermined rate or more rate (e.g. majority of clients) perform a manipulation of rotating a target image by 90 degrees. In this case, there is a high possibility that image data of the target image stored in the server device 200*a* was oriented in a manner against client's preference. As such, the manipulation of rotating a target image by 90 degrees should be adopted for the standard operation information.

Further, for example, the operation information managing section 234 may generate the standard operation information on the basis of the number of times one operation has been performed on one slide data item, the total number of times one operation has been performed on one slide data item, the frequency with which one operation has been performed on one slide data item, and a rate at which one operation has been performed on one slide data item, and others. For example, the operation information may be generated only if the total number of operation information items for one slide is more than a predetermined number. Alternatively, in a case the total number of operation information items for one slide is more than a predetermined value and the number of times a certain operation has been performed at a rate more than a predetermined rate relative to the total number of operation information items, the operation may be regarded as the standard operation information.

Figure 22:
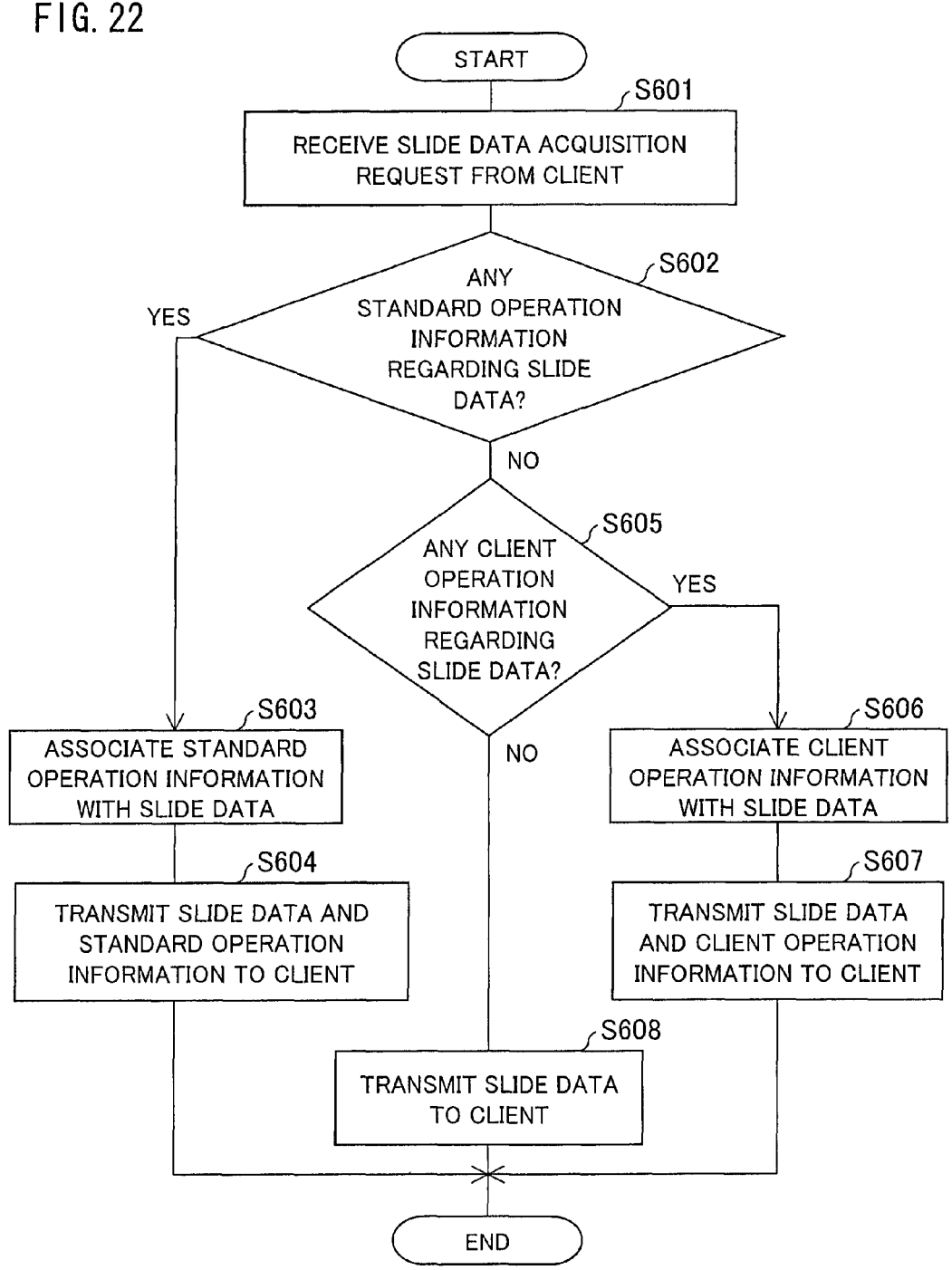
FIG. 22 is a flowchart showing a flow of processes performed when the server device, which is included in the image display system according to the still another embodiment of the present invention, has received slide data acquisition request.

FIG. 22 is a flowchart showing a flow of processes performed when the server device 200*a* has received a slide data acquisition request from the slideshow display device 100.

As illustrated in FIG. 22, upon receipt of a slide data acquisition request from the slideshow display device 100 (S601), the operation information managing section 234 determines whether standard operation information for a requested slide data has been stored in the operation information storage section 220*a* (S602).

If the standard operation information has been stored in the operation information storage section 220*a*, the standard operation information is associated with the corresponding slide data (S603). Then, the communication managing section 231 transmits to the client (a) the slide data and (b) the standard operation information associated with the slide data (S604) to end the process. Note that the operation information reflecting section 111 of the slideshow display device 100 controls the display screen creating section 113 to reflect the standard operation information in the slide data having been received from the server device 200*b*.

In S602, if the operation information managing section 234 determines that the standard operation information has not been stored, the operation information managing section 234 determines whether operation information regarding the requested slide data for the client who has requested the acquisition of the slide data has been stored in the operation information storage section 220*a* (S605).

If the operation information for the client who has requested the acquisition of the slide data has been stored in the operation information storage section 220*a*, the operation information is associated with the corresponding slide data (S606). Then, the communication managing section 231 transmits to the client (a) the slide data and (b) the operation information associated with the slide data (S607) to end the process.

In S605, if the operation information managing section 234 determines that the operation information for the client who has requested the acquisition of the slide data has not been stored, the operation information managing section 234 transmits the slide data to the client (S608) to end the process.

As described above, in the present embodiment, in a case where operation information items regarding one slide for a plurality of clients are stored, standard operation information is generated on the basis of these operation information items. Then, in response to a slide data acquisition request, slide data and the standard operation information are transmitted to a client who has requested the acquisition of the slide data.

This allows the users to view a slide in a more standard display manner (display manner that more users want) without making an edit on the slide. Therefore, after the slide is downloaded, it is possible to lighten load for the user of editing until a slide is displayed in a manner that the user wants. This reduces the frequency of making an edit for the user, thus reducing communication frequencies and the amount of communication data that occur between the slideshow display device 100 and the server device 200*a*, as compared with the arrangement of Second Embodiment.

In the present embodiment, the operation information needs to be stored in the server device 200*a* and the server device 200*a* needs to generate standard operation information, but the server device 200*a* does not edit slides. This arrangement makes it possible to reduce increased load on the server device 200*a*, as compared with the arrangement in which the server device 200*a* edits slides.

In the present embodiment, in a case where both standard operation information regarding an acquisition-requested slide data and operation information for a client who has requested acquisition of the slide data are stored, the standard operation information is transmitted to the client. However, the present invention is not limited to this arrangement. Alternatively, the operation information for a client who has requested acquisition may be transmitted, instead of the standard operation information.

Further, as in the case of the operation information stored in the operation information storage section 132 of the slideshow display device 100 in First Embodiment, the operation information adopted to generate the standard operation information in the server device 200*a* may be all edits that have been made on a slide to be displayed or a predetermined edit of edits that have been made a slide to be displayed.

The operation information to be adopted for generation of the target operation information may be, for example, manipulations performed on a slide target image (e.g. rotation of a target image; corrections including gamma correction, color correction, and contrast correction; and change of image correction parameters including skin tone correction, angle correction, and red-eye automatic correction).

Still further, in a case where the image display screen creation script is used to display a slide, the operation information to be adopted for generation of the standard operation information may be manipulations regarding the matters other than display of image data (e.g. rotation of a slide, zoom ratio (zoom-in/zoom-out), a display position (sideway scrolling and up and down scrolling), and whether a comment (character string) is to be displayed), which manipulations are created on the basis of the image display screen creation script.

Yet further, in the descriptions of the foregoing embodiments, the slideshow display device 100 which performs slideshow display is used. However, the present invention is not limited to this arrangement. In the descriptions of the foregoing embodiments, the server devices 200 and 200*a* manage image data album by album. However, the present invention is not limited to this arrangement. Instead, for example, only a particular image data item out of image data items stored in the server device 200*a* may be downloaded for display to a display device.

In the descriptions of the foregoing embodiments, an edit made on a slide is stored as the operation information. However, the present invention is not limited to this arrangement. Alternatively, for example, an edit made on any of image (still image) data, moving image data, text data, and animation data; streaming data or broadcast data received from an external entity; or multimedia data into which the foregoing data are integrated may be stored as the operation information, so that the data is downloaded, displayed, and played back in such a manner that the stored operation information is reflected in the data.

In the foregoing embodiments, the blocks included in the control section 110 of the slideshow display device 100 may be realized by hardware logic or may be realized by software by means of a CPU as follows.

That is, the slideshow display device 100 includes a CPU (central processing unit) that executes the order of an image display program for realizing the aforesaid functions, ROM (read only memory) that stores the image display program, RAM (random access memory) that develops the image display program in executable form, and a storage device (storage medium), such as memory, that stores the image display program and various types of data therein. With this arrangement, the object of the present invention is realized by a predetermined storage medium. The storage medium stores, in computer-readable manner, program codes (executable code program, intermediate code program, and source program) of the image display program of the slideshow display device 100, which is software for realizing the aforesaid functions. The storage medium is provided to the slideshow display device 100. With this arrangement, the slideshow display device 100 (alternatively, CPU or MPU) as a computer reads out and executes program code stored in the storage medium provided.

The storage medium may be tape based, such as a magnetic tape or cassette tape; disc based, such as a magnetic disk including a Floppy® disc and hard disk and optical disk including CD-ROM, MO, MD, DVD, and CD-R; card based, such as an IC card (including a memory card) and an optical card; or a semiconductor memory, such as a mask ROM, EPROM, EEPROM, and a flash ROM.

Further, the slideshow display device 100 may be arranged so as to be connectable to a communications network so that the program code is supplied to the slideshow display device 100 through the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

The blocks included in the control section 230 of the server devices 200 and 200*a* may be realized by hardware logic or may be realized by software by means of a CPU as in the case of the slideshow display device 100.

As described above, in order to solve the above problem, an image display device of the present invention is an image display device which displays on a display section an image corresponding to image display data acquired from an image data transmitting device, the image display device including: an operation receiving section receiving user's operation entry regarding edits of an image displayed on the display section; a data managing section storing operation information in an operation information storage section so that the operation information is associated with the image display data, the operation information being indicative of the operation entry regarding at least part of the edits; and a display control section editing the image corresponding to the image display data on the basis of the operation information corresponding to the image display data, which information is stored in the operation information storage section, so that an edited version of the image can be displayed on the display section.

Here, the image display data may be image data itself, such as image (still image) data, moving image data, text data, or animation data. In addition to such image data, the image display data may include layout data that specifies layout of a display screen for displaying the above image data. The layout data may include image data, such as character string, graphics, patterns, and others, which are displayed together with an image corresponding to the above image data. Further, the edits of the image are manipulations for changing a manner in which an image is displayed on the basis of the image data and/or the layout data. Examples of the edits of the image include: rotation; zoom-in; zoom-out; change of a display position; sideway scrolling and up and down scrolling; change on whether an image (character string, graphics, and others) included in the layout data are to be displayed or hidden; gamma correction; color correction; contrast correction; skin tone correction; angle correction; and red-eye automatic correction, all of which are performed on all or part of an image.

According to the above arrangement, when the operation receiving section receives user's operation entry regarding edits of an image displayed on the display section, the data managing section stores operation information in an operation information storage section so that the operation information is associated with the image display data, which operation information is indicative of the operation entry regarding at least part of the edits. Then, the display control section edits the image corresponding to the image display data on the basis of the operation information corresponding to the image display data, which information is stored in the operation information storage section, so that an edited version of the image can be displayed on the display section.

With this arrangement, at the time of displaying again image display data that has been previously displayed after acquisition of the image display data from the image data transmitting device, it is possible to display the image display data in such a manner that edits previously made on the image display data are reflected. This allows the user to view an image in a display manner that he/she wants, without doing editing operation. Further, the image data transmitting device does not need to edit the image display data. This does not increase load on the image data transmitting device.

Moreover, an edit made by the user is not reflected in the image display data stored in the image data transmitting device. With this arrangement, for example, even if desired display manners are different between a plurality of users who acquire one and the same image display data for display from the image data transmitting device, each of the users can view an image corresponding to the image display data in a display manner that he/she wants.

Further, in order to solve the above problem, the image display device of the present invention is an image display device which displays on a display section an image corresponding to image display data acquired from an image data transmitting device, the image display device including: a data managing section acquiring the image display data and operation information from the image data transmitting device, which operation information is indicative of edits to be applied to the image display data; and a display control section editing the image corresponding to the image display data on the basis of the operation information, so that an edited version of the image can be displayed on the display section.

According to the above arrangement, the data managing section acquires the image display data and operation information from the image data transmitting device, which operation information is indicative of edits to be applied to the image display data, and the display control section edits the image corresponding to the image display data on the basis of the operation information, so that an edited version of the image can be displayed on the display section.

With this arrangement, at the time of displaying the image display data acquired from the image data transmitting device, it is possible to display the image display data in such a manner that an edit indicated in the operation information, which has been acquired together with the image display data from the image data transmitting device, is reflected. This allows the user to view an image in a display manner that he/she prefers, without doing editing operation.

Moreover, for example, the image data transmitting device stores in advance operation information indicative of edits to be applied to the image display data. With this, at the time of transmitting the image display data, the image data transmitting device only needs to transmit the image display data and the operation information corresponding to the image display data. This eliminates the need for editing of the image display data by the image data transmitting device, thus enhancing convenience for the user without increasing load on the image data transmitting device.

The image display device of the present invention may further include: an operation receiving section receiving user's operation entry regarding edits of an image displayed on the display section, wherein the data managing section transmits operation information to the image data transmitting device so that the operation information is associated with the image display data, the operation information being indicative of operation entry regarding at least part of the edits.

According to the above arrangement, it is possible to transmit to the image data transmitting device the operation information regarding an edit made by the image display device in such a manner that the operation information is associated with the image display data that is an object to be edited. Therefore, the image data transmitting device stores in advance the operation information received from the image display device. This makes it possible for the image data transmitting device to transmit the operation information and the corresponding image display data, when the image data transmitting device needs to transmit again the corresponding image display data to the image display device.

With this arrangement, in displaying the image display data that was previously acquired from the image data transmitting device for display, the image display device can display the image display data in such a manner that an edit previously made on the image display data is reflected. This allows the user to view an image in a display manner that he/she wants, without doing editing operation.

Moreover, the image data transmitting device stores in advance the operation information transmitted from the image display device. With this, the image data transmitting device only needs to transmit the image display data and the operation information corresponding to the image display data, at the time of transmitting the image display data. This eliminates the need for editing of the image display data by the image data transmitting device, thus enhancing convenience for the user without increasing load on the image data transmitting device.

Further, in the above arrangement, the image display device may further include: an operation information storage section storing the operation information, wherein the data managing section temporarily stores at least part of the edits, which has been received by the operation receiving section, in the operation information storage section, and transmits at a predetermined timing to the image data transmitting device the operation information stored in the operation information storage section. For example, the data managing section may be arranged so as to transmit to the image data transmitting device the operation information stored in the operation information storage section, at a time when display of an image corresponding to the image display data is completed.

According to the above arrangement, the operation information is temporarily stored in the operation information storage section, so that the stored information is transmitted at a predetermined timing to the image data transmitting device. This arrangement makes it possible to reduce the communication frequency for transmission of the operation information, as compared with the arrangement in which the operation information is transmitted to the image data transmitting device every time the image display device receives the operation entry.

In order to solve the above problem, an image data transmitting device of the present invention is an image data transmitting device which transmits image display data to an image display device, and the image data transmitting device includes: a storage section storing therein image display data and operation information being indicative of edits to be applied to an image corresponding to the image display data; and a communication managing section, at a time of transmitting the image display data to the image display device, transmitting the image display data and the operation information corresponding to the image display data.

According to the above arrangement, at the time of transmitting the image display data to the image display device, the communication managing section transmits the image display data and the operation information corresponding to the image display data. With this arrangement, the user who views an image corresponding to the image display data with the use of the image display device, can display the image in such a manner that an edit indicated in the operation information is reflected, without doing editing operation.

Moreover, the image data transmitting device stores in advance in the storage section operation information indicative of edits to be applied to the image display data. With this, at the time of transmitting the image display data, the image data transmitting device only needs to transmit the image display data and the operation information corresponding to the image display data. This eliminates the need for editing of the image display data by the image data transmitting device, thus enhancing convenience for the user without increasing load on the image data transmitting device.

Further, the image data transmitting device of the present invention may further include: an operation information managing section, upon receipt from the image display device of operation information indicative of edits that a user has made on an image displayed on an image display device, the image corresponding to image display data which the image data transmitting device has transmitted to the image display device, causing the storage section to store therein the received operation information so that the received operation information is associated with the image display data that has been transmitted to the image display device.

According to the above arrangement, it is possible to receive from the image display device operation information indicative of edits that a user has made on an image displayed on an image display device, the image corresponding to image display data which the image data transmitting device has transmitted to the image display device, and causes the operation information in the storage section. Therefore, at the time of transmitting again the image display data to the image display device, it is possible to transmit the operation information regarding an edit made by the user of the image display device on an image corresponding to the image display data, and the corresponding image display data. With this arrangement, in displaying an image corresponding to the image display data acquired from the image data transmitting device, the user of the image display device can display the image in such a manner that an edit previously made on the image display data is reflected. This allows the user to view an image in a display manner that he/she wants, without doing editing operation.

Moreover, the image data transmitting device stores in advance the operation information transmitted from the image display device. With this, the image data transmitting device only needs to transmit the image display data and the operation information corresponding to the image display data, at the time of transmitting the image display data. This eliminates the need for editing of the image display data by the image data transmitting device, thus enhancing convenience for the user without increasing load on the image data transmitting device.

Further, the image data transmitting device of the present invention further include: an operation information managing section, upon receipt from the image display device of operation information indicative of edits that a user has made on an image displayed on an image display device, the image corresponding to image display data which the image data transmitting device has transmitted to the image display device, causing the storage section to store therein the received operation information so that the received operation information is associated with (i) the image display data that has been transmitted to the image display device and (ii) at least one of the image display device and the user; and a standard operation information generating section generating standard operation information on the basis of operation information items stored in the storage section, the operation information items corresponding to one image display data item and having been received from a plurality of image display devices or a plurality of users.

According to the above arrangement, upon receipt from the image display device of operation information indicative of edits that a user has made on an image displayed on an image display device, the image corresponding to image display data which the image data transmitting device has transmitted to the image display device, the operation information managing section causes the storage section to store therein the received operation information so that the received operation information is associated with (i) the image display data that has been transmitted to the image display device and (ii) at least one of the image display device and the user. The standard operation information generating section generates standard operation information on the basis of operation information items stored in the storage section, the operation information items corresponding to one image display data item and having been received from a plurality of image display devices or a plurality of users. With this arrangement, by generating standard operation information on the basis of operation information items corresponding to one image display data item and having been received from a plurality of image display devices or a plurality of users, it is possible to generate operation information that many users want.

The standard operation information generating section may be arranged so as to generate the standard operation information on the basis of (i) number of times one edit has been made on one image display data item, or (ii) a rate of the number of times one edit has been made on one image display data item, in total number of operation information items corresponding to the one image display data item, the information (i) or (ii) being stored in the operation information storage section.

According to the above arrangement, the standard operation information is generated on the basis of (i) number of times one edit has been made on one image display data item by a plurality of image display devices or a plurality of users, or (ii) a rate of the number of times one edit has been made on one image display data item by a plurality of image display devices or a plurality of users, in total number of operation information items corresponding to the one image display data item, the information (i) or (ii) being stored in the operation information storage section. Therefore, an edit that has been made by more people is reflected in the standard operation information. Thus, at the time when an image corresponding to image display data acquired from the image data transmitting device is displayed on the image display device, the user can view the image in a more standard display manner, without doing editing operation.

Moreover, since the user can view the image in a more standard display manner without doing editing operation, the frequency of an edit made on this image thereafter decreases. This makes it possible to reduce (a) the frequency with which the operation information is transmitted from the image display device to the image data transmitting device and (b) the amount of data corresponding to the operation information transmitted from the image display device to the image data transmitting device.

Further, the communication managing section may be arranged so as to, at the time of transmitting the image display data to the image display device, transmit the image display data and the standard operation information corresponding to the image display data.

According to the above arrangement, in displaying on the image display device an image corresponding to the image display data acquired from the image data transmitting device, it is possible to display the image in such a manner that an edit indicated in the standard operation information is reflected in the image. This allows the user to view an image in a display manner that many users want, without doing editing operation.

Moreover, the image data transmitting device generates standard operation information of the image display data on the basis of operation information items received from the image display devices, and at the time of transmitting the image display data, the image data transmitting device only needs to transmit the image display data and the standard operation information corresponding to the image display data. This eliminates the need for editing of the image display data by the image data transmitting device, thus enhancing convenience for the user without increasing load on the image data transmitting device.

In order to solve the above problem, an image display system of the present invention is an image display system including: an image data transmitting device which transmits image display data to an image display device; and the image display device which displays an image corresponding to the image display data on a display section, the image display device including: an operation receiving section receiving user's operation entry regarding edits of an image displayed on the display section; a data managing section storing operation information in an operation information storage section so that the operation information is associated with the image display data, the operation information being indicative of the operation entry regarding at least part of the edits; and a display control section edits the image corresponding to the image display data on the basis of the operation information corresponding to the image display data, which information is stored in the operation information storage section, so that an edited version of the image can be displayed on the display section.

With this arrangement, at the time of displaying again on the image display device image display data that has been previously displayed after acquisition of the image display data from the image data transmitting device, it is possible to display the image display data in such a manner that edits previously made on the image display data are reflected. This allows the user to view an image in a display manner that he/she wants, without doing editing operation. Further, the image data transmitting device does not need to make an edit on the image display data. This does not increase load on the image data transmitting device.

Moreover, an edit made by the user is not reflected in the image display data stored in the image data transmitting device. With this arrangement, for example, even if desired display manners are different between a plurality of users who acquire one and the same image display data for display from the image data transmitting device, each of the users can view an image corresponding to the image display data in a display manner that he/she wants.

In order to solve the above problem, the image display system of the present invention is an image display system including: an image data transmitting device which transmits image display data to an image display device; and the image display device which displays an image corresponding to the image display data on a display section, the image data transmitting device including: a storage section storing therein image display data and operation information being indicative of edits to be applied to an image corresponding to the image display data; and a communication managing section, at a time of transmitting the image display data to the image display device, transmitting the image display data and the operation information corresponding to the image display data, the image display device including: a data managing section acquiring the image display data and operation information from the image data transmitting device, the operation information being indicative of edits to be applied to the image display data; and a display control section editing the image corresponding to the image display data on the basis of the operation information, so that an edited version of the image can be displayed on the display section.

According to the above arrangement, at the time of transmitting the image display data to the image display device, the image data transmitting device transmits the image display data and the operation information corresponding to the image display data. The image display device edits the image display data acquired from the image data transmitting device on the basis of the operation information so that an edited image can be displayed on the display section. With this arrangement, at the time of displaying the image display data acquired from the image data transmitting device, it is possible to display the image display data in such a manner that an edit indicated in the operation information, which has been acquired together with the image display data from the image data transmitting device, is reflected. This allows the user to view an image in a display manner that he/she prefers, without doing editing operation.

Moreover, the image data transmitting device stores in advance operation information indicative of edits to be applied to the image display data. With this, at the time of transmitting the image display data, the image data transmitting device only needs to transmit the image display data and the operation information corresponding to the image display data. This eliminates the need for editing of the image display data by the image data transmitting device, thus enhancing convenience for the user without increasing load on the image data transmitting device.

In order to solve the above problem, an image display method of the present invention is an image display method of displaying on a display section of an image display device an image corresponding to image display data acquired from an image data transmitting device, the image display method including: an operation receiving step of receiving user's operation entry regarding edits of an image displayed on the display section; and a storing step of storing operation information so that the operation information is associated with the image display data, the operation information being indicative of the operation entry regarding at least part of the edits, wherein: the image corresponding to the image display data, which has been acquired from the image data transmitting device, is edited on the basis of the operation information corresponding to the image display data, which information is stored in the operation information storage section, so that an edited version of the image can be displayed on the display section.

According to the above method, at the time of displaying again on the image display device image display data that has been previously displayed after acquisition of the image display data from the image data transmitting device, it is possible to display the image display data in such a manner that edits previously made on the image display data are reflected. This allows the user to view an image in a display manner that he/she wants, without doing editing operation. Further, the image data transmitting device does not need to make an edit on the image display data. This does not increase load on the image data transmitting device.

Moreover, an edit made by the user is not reflected in the image display data stored in the image data transmitting device. With this arrangement, for example, even if desired display manners are different between a plurality of users who acquire one and the same image display data for display from the image data transmitting device, each of the users can view an image corresponding to the image display data in a display manner that he/she wants.

In order to solve the above problem, an image display method of the present invention is an image display method of displaying on a display section of an image display device an image corresponding to image display data acquired from an image data transmitting device, wherein: at a time of transmission of image display data from the image data transmitting device to the image display device, the image display data and operation information indicative of edits to be applied to an image corresponding to the image display data is transmitted; and the image corresponding to the image display data, which the image display device has acquired from the image data transmitting device, is edited on the basis of the operation information, so that an edited version of the image can be displayed on the display section.

According to the above method, at the time of transmitting the image display data to the image display device, the image data transmitting device transmits the image display data and the operation information corresponding to the image display data. The image display device edits the image display data acquired from the image data transmitting device on the basis of the operation information so that an edited image can be displayed on the display section. With this arrangement, at the time of displaying the image display data acquired from the image data transmitting device, it is possible to display the image display data in such a manner that an edit indicated in the operation information, which has been acquired together with the image display data from the image data transmitting device, is reflected. This allows the user to view an image in a display manner that he/she prefers, without doing editing operation.

Moreover, the image data transmitting device stores in advance operation information indicative of edits to be applied to the image display data. With this, at the time of transmitting the image display data, the image data transmitting device only needs to transmit the image display data and the operation information corresponding to the image display data. This eliminates the need for editing of the image display data by the image data transmitting device, thus enhancing convenience for the user without increasing load on the image data transmitting device.

Note that the image display device may be realized by a computer. In such a case, the scope of the present invention includes an image display program which causes a computer to realize the image display device by causing the computer to operate as the foregoing sections, and a computer-readable storage medium storing the image display program therein.

The image data transmitting device may be realized by a computer. In such a case, the scope of the present invention includes an image data transmission program which causes a computer to realize the image data transmitting device by causing the computer to operate as the foregoing sections, and a computer-readable storage medium storing the image data transmission program therein.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image display device which displays on a display section an image corresponding to image display data acquired from an image data transmitting device, the image display device comprising:
  a data managing section acquiring the image display data and operation information from the image data transmitting device, the operation information being indicative of edits to be applied to the image display data;
  a display control section editing the image corresponding to the image display data, which the image display device has acquired from the image data transmitting device, on the basis of the operation information, so that an edited version of the image can be displayed on the display section; and
  an operation receiving section receiving user's operation entry regarding edits of an image displayed on the display section,
  the data managing section transmitting modified operation information to the image data transmitting device so that the modified operation information is associated with the image display data, the modified operation information containing at least part of the edits which has been made in accordance with the user's operation entry.

2. The image display device according to claim 1, further comprising:
  an operation information storage section storing the operation information and the modified operation information, wherein
  the data managing section temporarily stores the modified operation information containing at least part of the edits, which has been received by the operation receiving section, in the operation information storage section, and transmits at a predetermined timing to the image data transmitting device the modified operation information stored in the operation information storage section.

3. The image display device according to claim 2, wherein:
  the data managing section transmits to the image data transmitting device the modified operation information stored in the operation information storage section, at a time when display of an image corresponding to the image display data is completed.

4. An image data transmitting device serving as a server which transmits, in response to a request from an image display device serving as a client, image display data to the image display device,
  the image data transmitting device comprising:
  a storage section storing therein image display data, operation information being indicative of edits to be applied to an image corresponding to the image display data, and an ID for identifying the image display device or a user of the image display device, the storage section storing therein the image display data, the operation information, and the ID in association with each other;
  a communication managing section, at a time of transmitting the image display data to the image display device, transmitting the image display data and the operation information associated with the image display data and the ID concerning the image display device; and
  an operation information managing section, upon receipt from the image display device of modified operation information indicative of edits that the user has made on an image displayed on the image display device, the displayed image corresponding to the operation information and the image display data which the image data transmitting device has transmitted to the image display device, causing the storage section to store therein (i) the received modified operation information and (ii) the ID concerning the image display device so that (i) the received modified operation information and (ii) the ID concerning the image display device are associated with the image display data that has been transmitted to the image display device.

5. The image data transmitting device according to claim 4, further comprising:
  a standard operation information generating section generating standard operation information on the basis of operation information items stored in the storage section, the operation information items corresponding to one image display data item and having been received from a plurality of image display devices or a plurality of users.

6. The image data transmitting device according to claim 5, wherein:
the standard operation information generating section generates the standard operation information on the basis of (i) number of times one edit has been made on one image display data item, or (ii) a rate of the number of times one edit has been made on one image display data item, in total number of operation information items corresponding to the one image display data item, the information (i) or (ii) being stored in the storage section.

7. The image data transmitting device according to claim 5, wherein:
the communication managing section, at a time of transmitting the image display data to the image display device, transmits the image display data and the standard operation information corresponding to the image display data.

8. An image display system comprising: an image data transmitting device serving as a server; and an image display device serving as a client, the image data transmitting device transmitting, in response to a request from the image display device, image display data to the image display device, and the image display device displaying an image corresponding to the image display data on a display section,
the image display device comprising:
a data managing section acquiring the image display data and operation information from the image data transmitting device, the operation information being indicative of edits to be applied to the image display data;
a display control section editing the image corresponding to the image display data, which the image display device has acquired from the image data transmitting device, on the basis of the operation information, so that an edited version of the image can be displayed on the display section; and
an operation receiving section receiving user's operation entry regarding edits of an image displayed on the display section,
the data managing section transmitting modified operation information to the image data transmitting device so that the modified operation information is associated with the image display data, the modified operation information containing at least part of the edits which has been made in accordance with the user's operation entry.

9. An image display system comprising: an image data transmitting device serving as a server; and an image display device serving as a client, the image data transmitting device transmitting, in response to a request from the image display device, image display data to the image display device, and the image display device displaying an image corresponding to the image display data on a display section,
the image data transmitting device comprising:
a storage section storing therein image display data, operation information being indicative of edits to be applied to an image corresponding to the image display data, and an ID for identifying the image display device or a user of the image display device, the storage section storing therein the image display data, the operation information, and the ID in association with each other;
a communication managing section, at a time of transmitting the image display data to the image display device, transmitting the image display data and the operation information associated with the image display data and the ID concerning the image display device; and
an operation information managing section, upon receipt from the image display device of modified operation information indicative of edits that the user has made on an image displayed on an image display device, the displayed image corresponding to the operation information and the image display data which the image data transmitting device has transmitted to the image display device, causing the storage section to store therein (i) the received modified operation information and (ii) the ID concerning the image display device so that (i) the received modified operation information and (ii) the ID concerning the image display device are associated with the image display data that has been transmitted to the image display device,
the image display device comprising:
a data managing section acquiring the image display data and operation information from the image data transmitting device, the operation information being indicative of edits to be applied to the image display data; and
a display control section editing the image corresponding to the image display data, which the image display device has acquired from the image data transmitting device, on the basis of the operation information, so that an edited version of the image can be displayed on the display section.

10. An image display method of displaying on a display section of an image display device an image corresponding to image display data acquired from an image data transmitting device, said method comprising the steps of:
acquiring, by the image display device, the image display data and operation information from the image data transmitting device, the operation information being indicative of edits to be applied to the image display data;
editing, by the image display device, the image corresponding to the image display data, which the image display device has acquired from the image data transmitting device, the image display device editing the image on the basis of the operation information, so that an edited version of the image can be displayed on the display section;
receiving, by the image display device, user's operation entry regarding edits of an image displayed on the display section; and
transmitting, by the image display device, modified operation information to the image data transmitting device so that the modified operation information is associated with the image display data, the modified operation information being indicative of at least part of the edits which has been made in accordance with the user's operation entry.

11. A computer-readable storage medium storing therein a program for causing a computer to operate as an image display device which displays on a display section an image corresponding to image display data acquired from an image data transmitting device,
the program being an image display program for causing the computer to carry out the steps of:
acquiring the image display data and operation information from the image data transmitting device, the operation information being indicative of edits to be applied to the image display data;
editing the image corresponding to the image display data, which the image display device has acquired from the image data transmitting device, on the basis of the operation information, so that an edited version of the image can be displayed on the display section;

receiving user's operation entry regarding edits of an image displayed on the display section; and transmitting modified operation information to the image data transmitting device so that the modified operation information is associated with the image display data, the modified operation information containing at least part of the edits which has been made in accordance with the user's operation entry.

12. A computer-readable storage medium storing therein a program for causing a computer to operate as an image data transmitting device serving as a server, the image data transmitting device transmitting, in response to a request from an image display device serving as a client, image display data to the image display device, the image data transmitting device including:

a storage section storing therein image display data, operation information being indicative of edits to be applied to an image corresponding to the image display data, and an ID for identifying the image display device or a user of the image display device, the storage section storing therein the operation information, the image display data, and the ID in association with each other, the program being an image data transmission program for causing the computer to carry out the following steps of:

transmitting, at a time of transmitting the image display data to the image display device, the image display data and the operation information associated with the image display data and the ID concerning the image display device;

receiving, from the image display device, modified operation information indicative of edits that the user has made on an image displayed on the image display device, the displayed image corresponding to the operation information and the image display data which the image data transmitting device has transmitted to the image display device; and causing the storage section to store therein (i) the received modified operation information and (ii) the ID concerning the image display device so that (i) the received modified operation information and (ii) the ID concerning the image display device are associated with the image display data that has been transmitted to the image display device.

13. An image data transmission method, carried out by an image data transmitting device serving as a server, for transmitting, in response to a request from an image display device serving as a client, image display data to the image display device, the image data transmitting device including:

a storage section storing therein image display data, operation information being indicative of edits to be applied to an image corresponding to the image display data, and an ID for identifying the image display device or a user of the image display device, the storage section storing therein the image display data, the operation information, and the ID in association with each other, said method comprising the steps of:

transmitting, at a time of transmitting the image display data to the image display device, the image display data and the operation information associated with the image display data and the ID concerning the image display device;

receiving, from the image display device, modified operation information indicative of edits that the user has made on an image displayed on the image display device, the displayed image corresponding to the operation information and the image display data which the image data transmitting device has transmitted to the image display device; and causing the storage section to store therein (i) the received modified operation information and (ii) the ID concerning the image display device so that (i) the received modified operation information and (ii) the ID concerning the image display device are associated with the image display data that has been transmitted to the image display device.

* * * * *